(12) United States Patent
Osada et al.

(10) Patent No.: US 9,087,028 B2
(45) Date of Patent: Jul. 21, 2015

(54) TEST METHOD, TEST APPARATUS, AND RECORDING MEDIUM

(71) Applicant: FUJITSU LIMITED, Kawasaki-shi (JP)

(72) Inventors: Takahiro Osada, Itabashi (JP); Mamoru Arisumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 13/716,298

(22) Filed: Dec. 17, 2012

(65) Prior Publication Data

US 2013/0246852 A1 Sep. 19, 2013

(30) Foreign Application Priority Data

Mar. 19, 2012 (JP) ................. 2012-062023

(51) Int. Cl.
*G06F 11/00* (2006.01)
*G06F 11/22* (2006.01)
*G06F 11/263* (2006.01)

(52) U.S. Cl.
CPC ............ *G06F 11/2236* (2013.01); *G06F 11/00* (2013.01); *G06F 11/263* (2013.01)

(58) Field of Classification Search
CPC ..... G06F 11/004; G06F 11/00; G06F 11/008; G06F 11/22; G06F 11/28; G06F 11/30; G06F 11/263; G06F 11/2236
USPC ....................................... 714/47.1
See application file for complete search history.

(56) References Cited

U.S. PATENT DOCUMENTS

| 5,732,209 | A | * | 3/1998 | Vigil et al. ................. 714/30 |
| 5,946,487 | A | * | 8/1999 | Dangelo ................... 717/148 |
| 5,978,838 | A | * | 11/1999 | Mohamed et al. ........... 709/208 |
| 7,568,030 | B2 | * | 7/2009 | Banerjee et al. ............. 709/224 |
| 7,610,537 | B2 | * | 10/2009 | Dickinson et al. ........... 714/733 |
| 7,685,487 | B1 | * | 3/2010 | Kuo et al. .................. 714/726 |
| 8,046,745 | B2 | * | 10/2011 | Wong ........................ 717/130 |
| 8,819,505 | B2 | * | 8/2014 | Vorbach et al. .............. 714/724 |
| 2003/0005380 | A1 | * | 1/2003 | Nguyen et al. .............. 714/736 |
| 2004/0138847 | A1 | * | 7/2004 | Lebee et al. ................ 702/123 |
| 2008/0033900 | A1 | * | 2/2008 | Zhang et al. ................ 706/52 |
| 2008/0148117 | A1 | * | 6/2008 | Seuring ..................... 714/726 |
| 2008/0148120 | A1 | * | 6/2008 | Seuring ..................... 714/742 |
| 2009/0106717 | A1 | * | 4/2009 | Chen et al. ................. 716/6 |
| 2009/0240931 | A1 | * | 9/2009 | Coon et al. ................. 712/234 |
| 2010/0192012 | A1 | * | 7/2010 | Parulkar .................... 714/24 |
| 2011/0154127 | A1 | * | 6/2011 | Bhandari et al. ............ 714/47.3 |

(Continued)

FOREIGN PATENT DOCUMENTS

| JP | 2010-218277 | 9/2010 |
| WO | WO 2010/106403 A1 | 9/2010 |

*Primary Examiner* — Amine Riad
(74) *Attorney, Agent, or Firm* — Fujitsu Patent Center

(57) ABSTRACT

A test method which tests a processing device includes: obtaining a maximum number of processing units with which the processing device as a test target can simultaneously parallel process a plurality of threads; specifying a number of threads, causing the processing device as the test target to parallel process the threads, and obtaining a processing time corresponding to the number of threads; and outputting information indicating that the processing device as the test target is normal when the number of threads for which the processing time is more than or equal to a threshold matches the maximum number of processing units which can simultaneously parallel process, or outputting information indicating that the processing device as the test target is abnormal when the number of threads does not match.

18 Claims, 17 Drawing Sheets

(56) References Cited

U.S. PATENT DOCUMENTS

| | | |
|---|---|---|
| 2012/0005535 A1* | 1/2012 | Shigehara .................. 714/26 |
| 2012/0084603 A1* | 4/2012 | Riley ........................ 714/30 |
| 2012/0096314 A1* | 4/2012 | Motika et al. ............. 714/30 |
| 2012/0324292 A1* | 12/2012 | Bhat et al. ............... 714/38.1 |
| 2013/0061098 A1* | 3/2013 | Shigehara ................ 714/47.1 |
| 2013/0159799 A1* | 6/2013 | Brown et al. ............. 714/726 |
| 2013/0231888 A1* | 9/2013 | Sugimura et al. ......... 702/123 |
| 2013/0332774 A1* | 12/2013 | Sinanoglu ................. 714/32 |
| 2014/0089734 A1* | 3/2014 | Busaba et al. ............ 714/16 |
| 2014/0089928 A1* | 3/2014 | Stern et al. ............... 718/102 |
| 2014/0201575 A1* | 7/2014 | Douskey et al. .......... 714/40 |
| 2014/0208165 A1* | 7/2014 | Kang et al. ............... 714/37 |
| 2014/0268351 A1* | 9/2014 | VanderPloeg et al. .... 359/604 |
| 2014/0298124 A1* | 10/2014 | Douskey et al. .......... 714/726 |

* cited by examiner

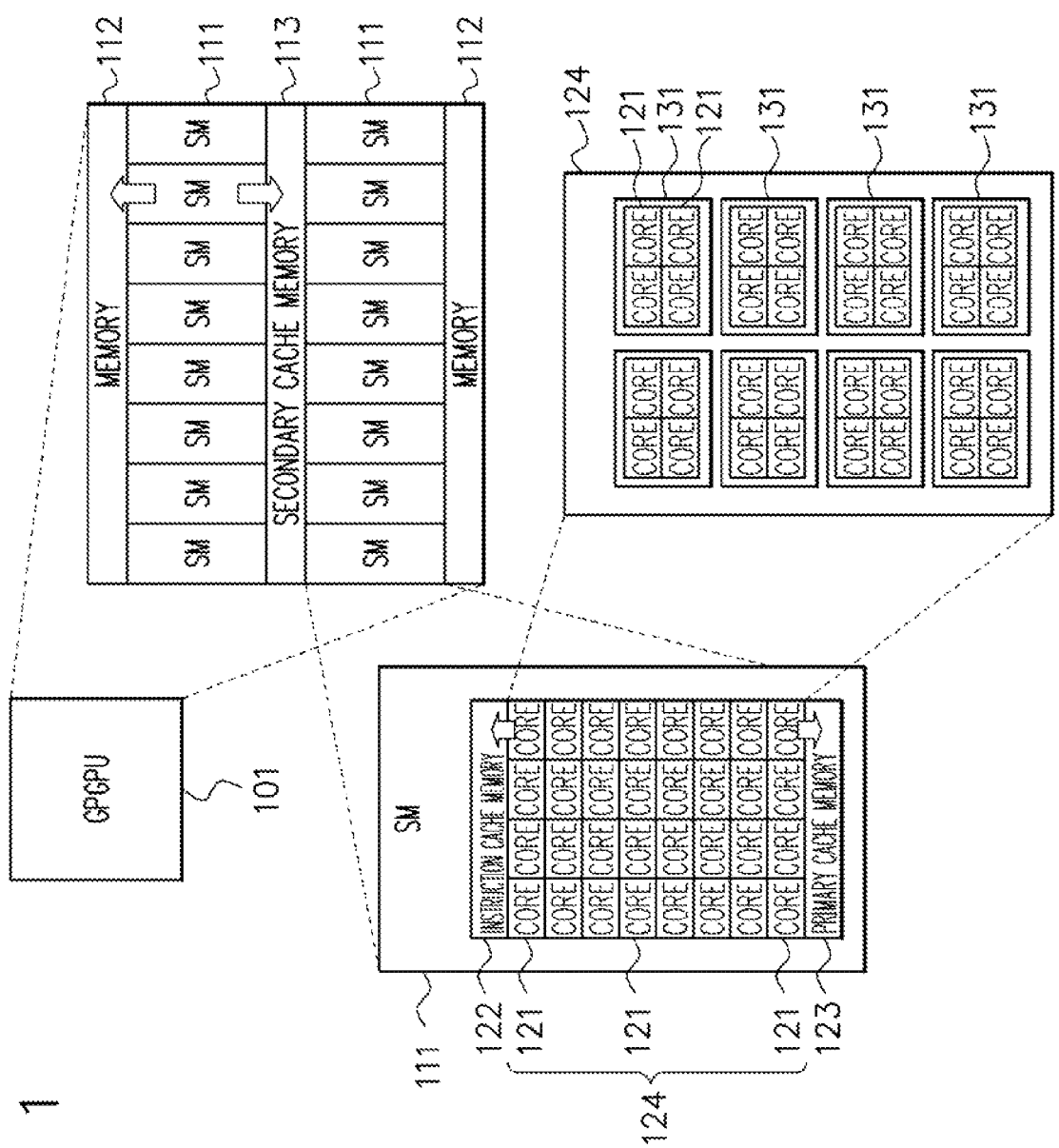

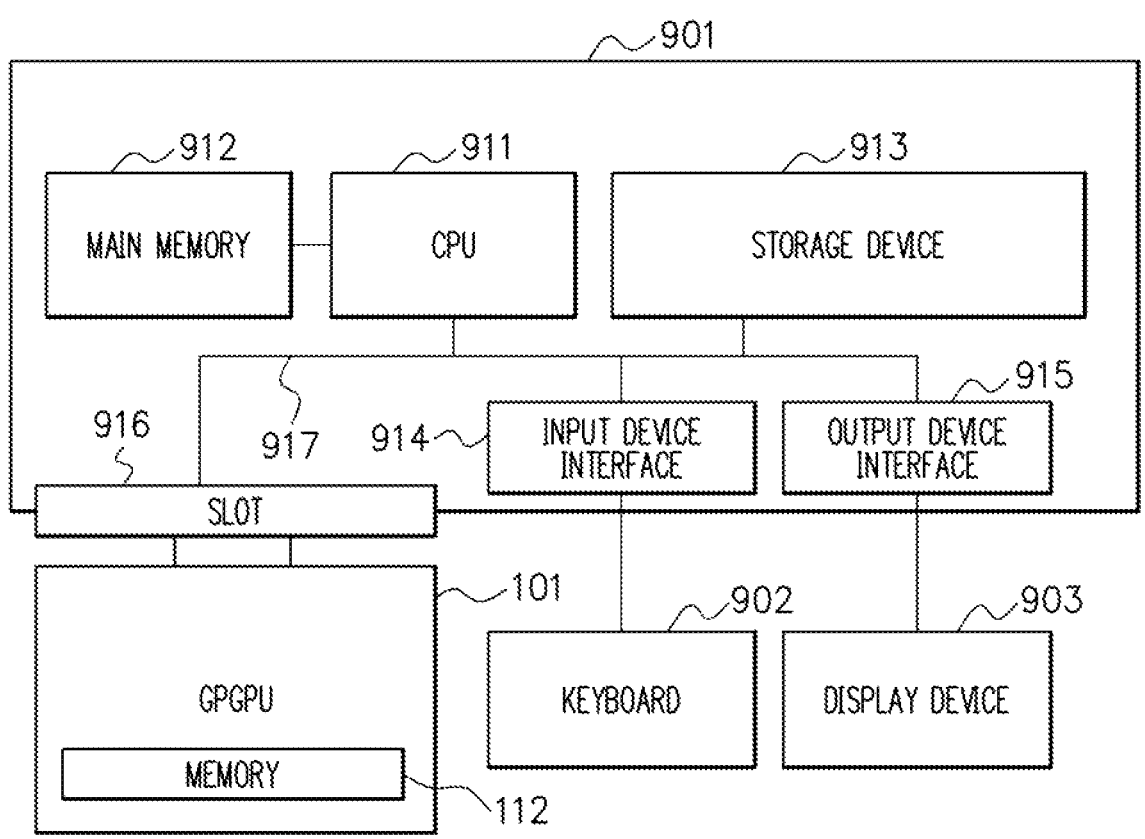
F I G. 9

F I G. 11

| | GPGPU A | GPGPU B | GPGPU C |
|---|---|---|---|
| T — GPGPU MODEL NAME | | | |
| G — NUMBER OF IN-SM THREAD GROUPS | 0 | 8 | 8 |
| M — MAXIMUM NUMBER OF PARALLEL PROCESSED THREADS | 10000 | 10000 | 20000 |
| P — MINIMUM CALCULATION PERFORMANCE COEFFICIENT | 1.3 | 1.3 | 1.2 |

1011

US 9,087,028 B2

TEST METHOD, TEST APPARATUS, AND RECORDING MEDIUM

CROSS-REFERENCE TO RELATED APPLICATION

This application is based upon and claims the benefit of priority of the prior Japanese Patent Application No. 2012-062023, filed on Mar. 19, 2012, the entire contents of which are incorporated herein by reference.

FIELD

The embodiment discussed herein is directed to a test method, a test apparatus, and a recording medium.

BACKGROUND

There is known a fault diagnosis system for a multicore CPU, in which a plurality of CPU (Central Processing Unit) cores capable of switching from an SMP (symmetric Multi-Processing) mode to an AMP (Asymmetric Multiprocessing) mode are mounted, the fault diagnosis system having a load predicting unit which predicts a processing load of the multicore CPU, a mode switching unit which switches one of the CPU cores to the AMP mode when the processing load is less than a threshold, and a fault diagnosis unit which performs fault diagnosis on the CPU core switched to the AMP -node (see, for example, Patent Literature 1).

Patent Literature 1: Japanese Laid-open Patent Publication No, 2010-218277

In a test of a general-purpose CPU, a defective core can be identified by specifying different instruction sequences to ail cores in the CPU to have them execute a test, and checking the calculation results thereof.

On the other hand, a GPGPU (General-purpose computing on Graphics Processing Units; is a processing device which applies calculation resources of a GPO (Graphics Processing Units) to purposes other than image processing. The GPU is a processing device dedicated for image processing.

In the GPGPU, it is not possible to specify a core in the GPGPU to have the core perform each instruction sequence. When there is a defective core, another normal core performs processing as a substitute for the defective core, and thus it is difficult to test whether there is a defective core or not.

SUMMARY

A test method which tests a processing device includes: obtaining a maximum number of processing units with which the processing device as a test target can simultaneously parallel process a plurality of threads; specifying a number of threads, causing the processing device as the test target to parallel process the threads, and obtaining a processing time corresponding to the number of threads; and outputting information indicating that the processing device as the test target is normal when the number of threads for which the processing time is more than or equal to a threshold matches the maximum number of processing units which can simultaneously parallel process, or outputting information indicating that the processing device as the test target is abnormal when the number of threads does not match.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a structural example of a GPGPU as a test target according to an embodiment;

FIG. 9 is a diagram illustrating a structural example of a test system according to this embodiment;

FIG. 11 is a diagram illustrating an example of contents of an operation definition file in a storage device;

DESCRIPTION OF EMBODIMENTS

Figure 2A:
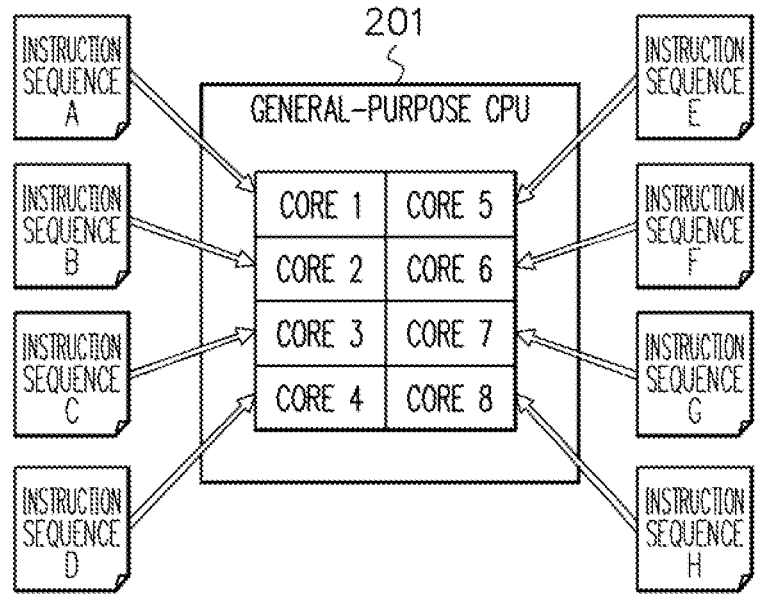
FIG. 2A is a diagram for explaining a test method for a general-purpose CPU.

FIG. 1 is a diagram illustrating a structural example of a GPGPU as a test target according to an embodiment. A GPGPU 101 has a plurality of streaming multiprocessors (SM) 111, a memory 112, and a secondary cache memory 113. The memory 112 is a GDDR (Graphics Double Data Rate) memory, for example. The SM 111 can access the memory 112 and the secondary cache memory 113.

The SM 111 has a core group 124, an instruction cache memory 122 and a primary cache memory 123. The instruction cache memory 122 is a cache memory for instructions, and the primary cache memory 123 is a cache memory for data. The core group 124 has a plurality of cores 121.

As processing units for instruction sequences (threads), there are two methods: a method to process in units of cores 121, and a method to make groups of pluralities of cores 121 and process in units of groups. First, a method to process in units of cores 121 will be described. In this method, the cores 121 are processing units which can simultaneously parallel process instruction sequences. Since all the cores 121 can parallel process, it is possible to simultaneously parallel process instruction sequences by the number of cores 121. For example, when the GPGPU 101 has 16 SMs 111 and each SM 111 has 32 cores 121, the total number of cores 121 is 16×32=512. Therefore, the GPGPU 101 is able to simultaneously parallel process up to 512 instruction sequences at a maximum. That is, the maximum number of processing units which can simultaneously parallel process is 512.

Next, the method to process in units of groups will be described. In this method, the core group 124 has a plurality of thread groups 131, and the thread groups 131 axe processing units which can simultaneously parallel process instruction sequences. Each thread group 131 has a plurality of cores (for example, four cores) 121 to which different roles are assigned. One instruction sequence (thread) is processed in a unit of each thread group 131. Since all the thread groups 131 can simultaneously parallel process, it is possible to simultaneously parallel process instruction sequences by the number of thread groups 131. For example, when the GPGPU 101 has 16 SMs 111, and each SM 111 has 8 thread groups 131, the total number of thread groups 131 is 16×8=128. Therefore, the GPGPU 101 is able to simultaneously parallel process up to 128 instruction sequences at a maximum. That is, the maximum number of processing units which can simultaneously parallel process is 128.

FIG. 2A is a diagram for explaining a test method for a general-purpose CPU 201. In the general-purpose CPU 201, the numbers of cores 1 to 8 can be specified respectively for different instruction sequences A to H to process these sequences. For example, it is possible to specify which core processes which instruction sequence such as processing the instruction sequence A in the core 1, processing the instruction sequence B in the core 2, and so on. Therefore, by checking calculation results of the instruction sequences A to H, it is possible to determine whether normal calculation is performed or not in each of the cores 1 to 6, and thereby it is possible to determine whether each of the cores 1 to 8 is good or bad.

Figure 2B:
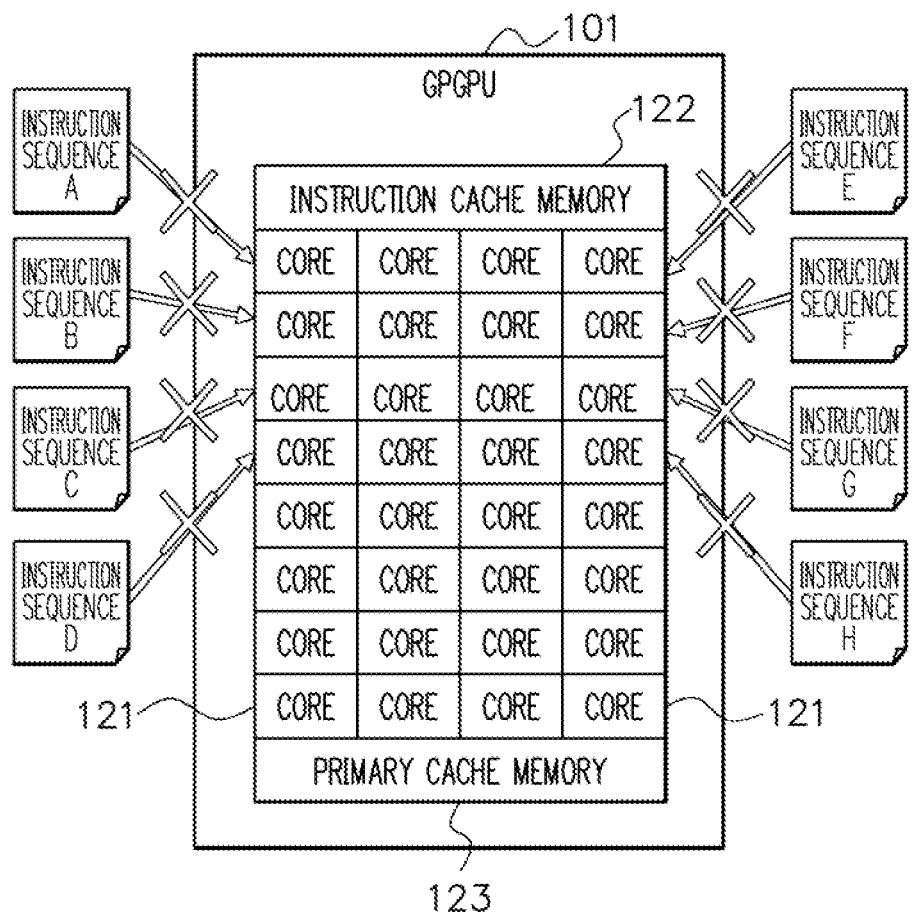
FIG. 2B is a diagram for explaining a test method for the GPGPU.

FIG. 2B is a diagram for explaining a test method for the GPGPU 101. In the GPGPU 101, it is not possible to specify the numbers of the respective cores 121 for the different instruction sequences A to H to process these sequences. The GPGPU 101 is only instructed to process the instruction sequences A to H, in which the number of the cores 121 cannot be specified, and which core 121 processes which instruction sequence A to H is unknown. The cores 121 which process the instruction sequences A to H are assigned arbitrarily. Therefore, it is not possible to determine whether each of the cores 121 is good or bad by checking calculation results of the instruction sequences A to H.

Figure 3A:
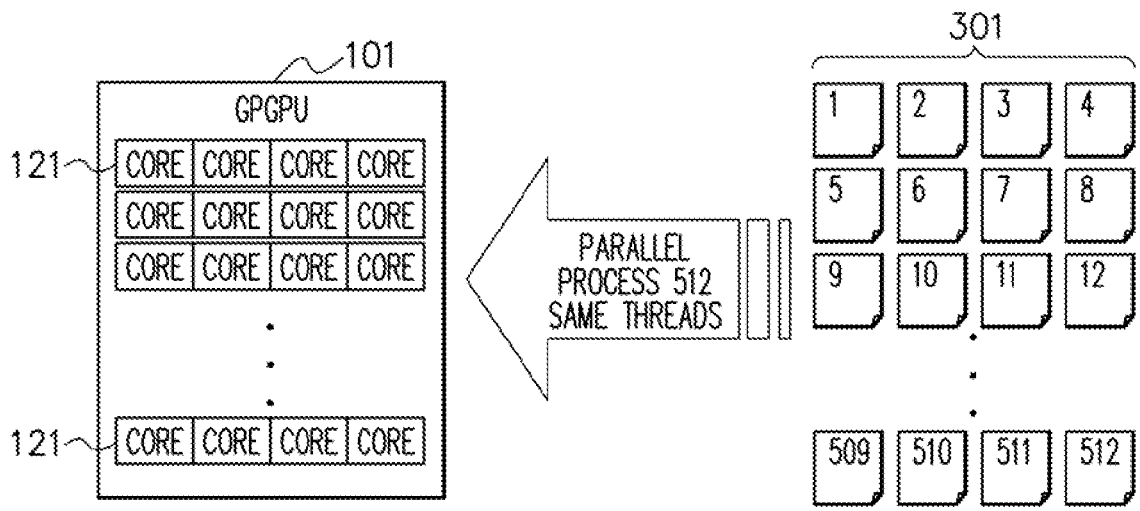
FIG. 3A is a diagram illustrating a processing example of the normal GPGPU in which all cores are normal.

FIG. 3A is a diagram illustrating a processing example of the normal GPGPU 101 in which all the cores 121 are normal. As described above, in the method to process instruction sequences in units of cores 121, the GPGPU 101 has 512 cores 121 which can simultaneously parallel process. A thread 301 is a processing unit instruction formed of one or more instructions, and each instruction has an instruction code and/or data. For example, the instruction has an operation code and an operand, the operation code being the instruction code and the operand being the data. Note that for making the GPGPU 101 exhibit the maximum calculation performance, it is preferred that the thread 301 be a thread of floating point operation. When the GPGPU 101 is instructed to parallel process the same 512 threads 301, the 512 cores 121 in the GPGPU 101 parallel process the 512 threads 301 simultaneously. When it is instructed to process one thread 301, one core 121 in the GPGPU 101 processes one thread 301 when it is instructed to parallel process two same threads 301, two cores 121 in the GPGPU 101 parallel process the two threads 301 simultaneously. When it is instructed to parallel process three same threads 301, three cores 121 in the GPGPU 101 parallel process the three threads 301 simultaneously. Likewise, when it is instructed to parallel process 512 same threads 301, 512 cores 121 in the GPGPU 101 parallel process the 512 threads 301 simultaneously. Therefore, the respective processing times of the GPGPU 101 when being instructed to parallel process 1 to 512 threads 301 are substantially the same. That is, the processing time of one thread 301 and the processing time of 512 threads 301 are substantially the same.

Figure 3B:
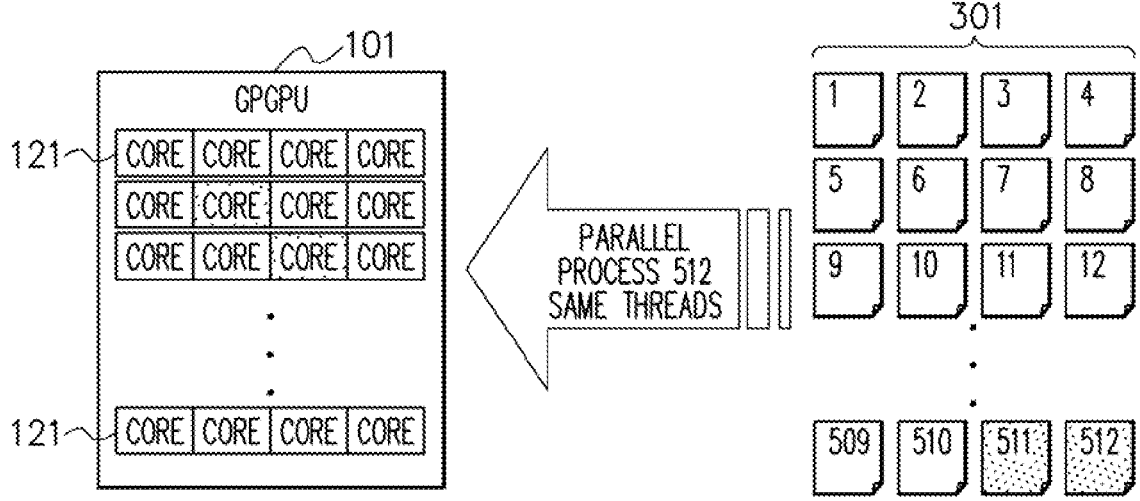
FIG. 3B is a diagram illustrating a processing example of the GPGPU in which defective cores exist.

FIG. 3B is a diagram illustrating a processing example of the GPGPU 101 in which defective cores exist. As described above, the GPGPU 101 has 512 cores 121. For example, the case where the 512 cores 121 have two defective cores 121 and 510 normal cores 121 will be described. When the GPGPU 101 is instructed to parallel process 512 same threads 301, the 510 normal cores 121 in the GPGPU 101 parallel process the 510 threads 301 simultaneously. At this moment, processing of the 510 threads 301 is performed in the 512 threads 301, but processing of the remaining two threads 301 is put on standby. Thereafter, among the 510 normal cores 121, two normal cores 121 which completed the processing of the threads 301 parallel process the remaining two threads 301 simultaneously. Therefore, the processing time of the GPGPU 101 having the defective cores of FIG. 3B becomes approximately two times the processing time of the GPGPU 101 having no defective core of FIG. 3A. In the case of FIG. 3B, the respective processing times of the GPGPU 101 when being instructed to parallel process 1 to 510 threads 301 are substantially the same. On the other hand, the processing times of the 511 and 512 threads 301 are about two times the processing time of the 1 to 510 threads 301. Further, since the 512 threads 301 are processed by the 510 normal cores 121, calculation results of the 512 threads 301 all become normal. Therefore, it is not possible to find out the existence of the two defective cores 121 by checking the calculation results of the 512 threads 301.

Accordingly, this embodiment focuses on the difference between the processing time of the GPGPU 101 having no defective core of FIG. 3A and the processing time of the GPGPU 101 having defective cores of FIG. 3B, and performs a test on whether there are any defective core or not.

Figure 4:
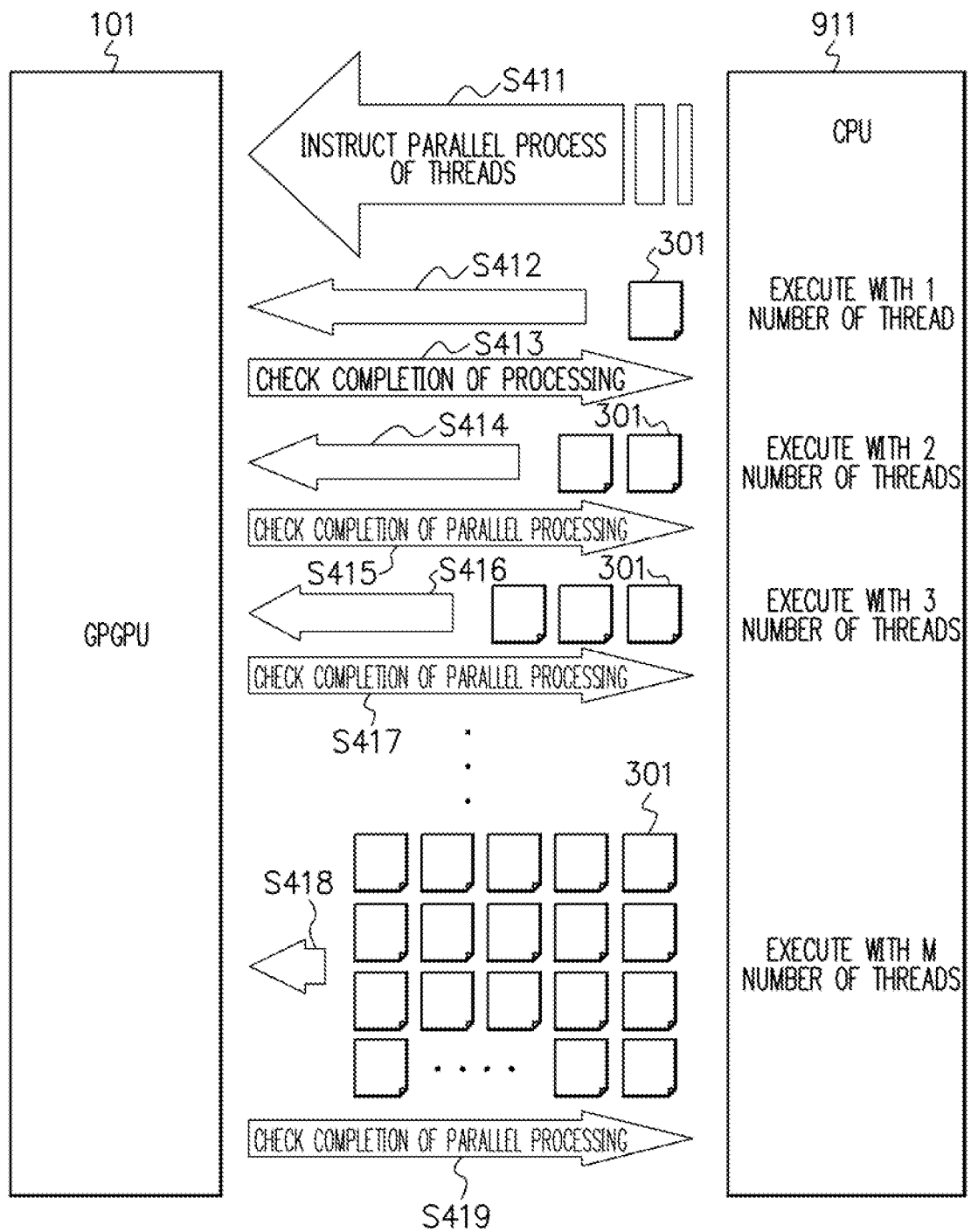
FIG. 4 is a diagram for explaining a test method for the GPGPU according to this embodiment.

FIG. 4 is a diagram for explaining a test method for the GPGPU 101 according to this embodiment. A CPU 911 is a CPU of a test apparatus and performs a test of the GPGPU 101. First, in step S411, the CPU 911 instructs the GPGPU 101 to parallel process threads.

Next, in step S412, the CPU 911 instructs the GPGPU 101 to start processing of one thread 301 of floating point operation, and starts to measure the processing time of the one thread 301. Then, in step S413, when a processing completion notification is inputted from the GPGPU 101, the CPU 911 finishes the measurement of the processing time and obtains the processing time of one thread 301.

Next, in step S414, the CPU 911 instructs the GPGPU 101 to start parallel processing of two same threads 301 of floating point operation, and starts to measure the processing time of the two threads 301. Then, instep S415, when a processing completion notification is inputted from the GPGPU 101, the CPU 911 finishes the measurement of the processing time, and obtains the processing time of two threads 301.

Next, in step S416, the CPU 911 instructs the GPGPU 101 to start parallel processing of three same threads 301 of floating point operation, and starts to measure the processing time of the three threads 301. Then, in step S417, when a processing completion notification is inputted from the GPGPU 101, the CPU 911 finishes the measurement of the processing time, and obtains the processing time of three threads 301.

Thereafter, the number of threads 301 to be parallel processed is similarly increased sequentially, and the processing time of each number of threads 301 is obtained.

Finally, in step S418, the CPU 911 instructs the GPGPU 101 to start parallel processing of M same threads 301 of floating point operation, and starts to measure the processing time of the M threads 301. Here, M denotes the maximum number of parallel processed threads to perform the test. The maximum number of parallel processed threads M is, for example, 100000 or 200000 as illustrated in FIG. 11. Then, in step S419, when a processing completion notification is inputted from the GPGPU 101, the CPU 911 finishes the measurement of the processing time, and obtains the processing time of M threads 301.

Figure 5:
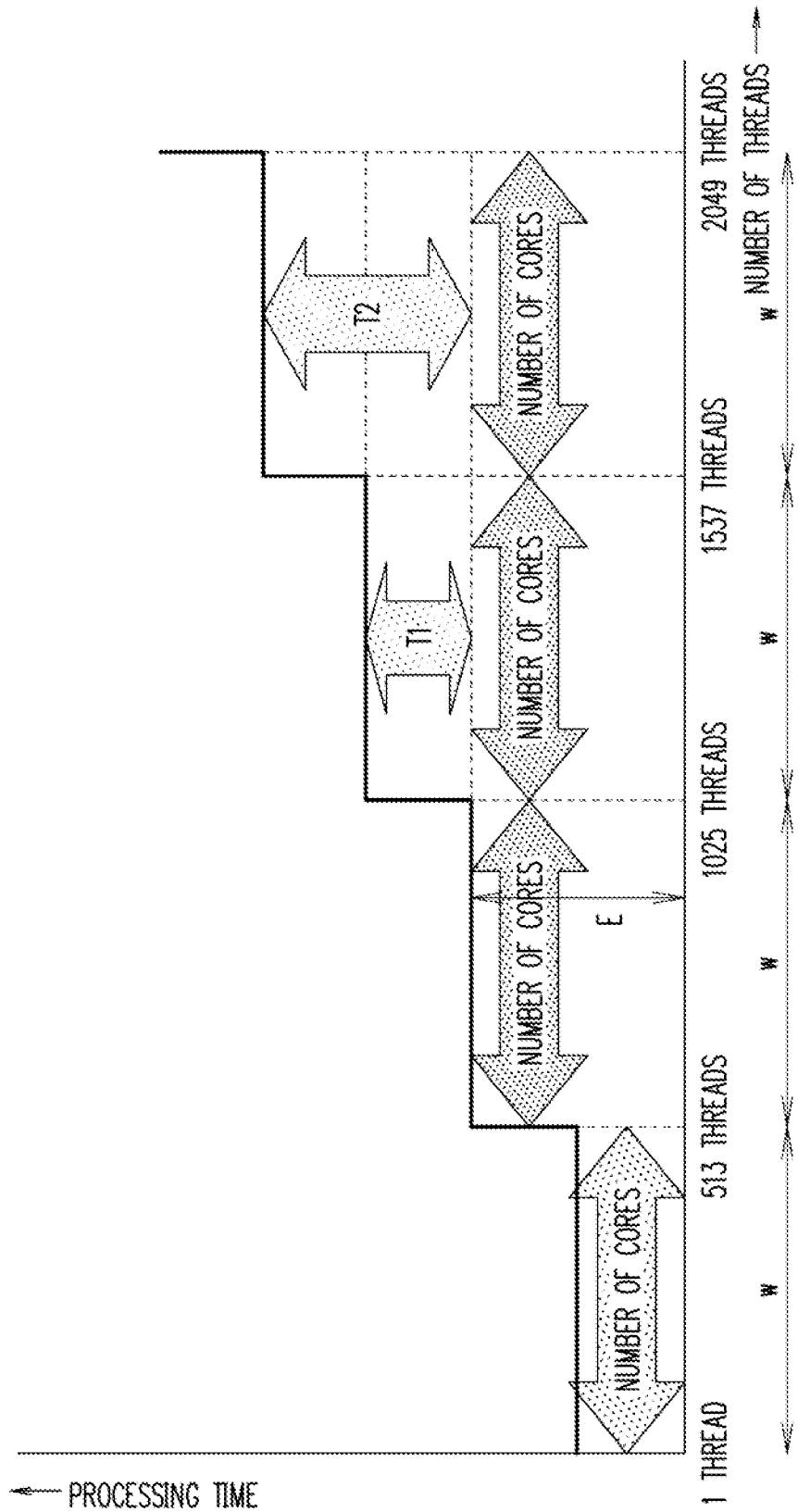
FIG. 5 is a diagram illustrating the processing time of each number of threads of the GPGPU of a method to process threads in units of cores.

FIG. 5 is a diagram illustrating the processing time of each number of threads of the GPGPU 101 of the method to process threads in units of cores 121 (FIG. 1). In the case of this method, the GPGPU 101 has 512 cores 121 as described above, and thus can simultaneously parallel process up to 512 threads 301 at a maximum. Therefore, processing times of 1 to 512 threads 301 are substantially the same, processing times of 513 to 1024 threads 301 are substantially the same, processing times of 1025 to 1536 threads 301 are substantially the same, and processing times of 1537 to 2048 threads 301 are substantially the same.

The processing time of 513 to 1024 threads 301 is about two times the processing time of 1 to 512 threads 301. Further, the increased processing time T2 of 1537 to 2048 threads 301 is about two times the increased processing time T1 of 1025 to 1536 threads 301. Here, the increased processing time T2 of 1537 to 2048 threads 301 is a time obtained by subtracting the processing time E of 513 to 1024 threads 301 from the processing time of 1537 to 2048 threads 301. Further, the increased processing time T1 of the 1025 to 1536 threads 301 is a time obtained by subtracting the processing time E of 513 to 1024 threads 301 from the processing time of 1023 to 1536 threads 301.

As described above, as the number of threads increases, the processing time varies largely at cycles of thread intervals w. As illustrated in FIG. 3A, in the case of the GPGPU 101 having no defective core, a thread interval w is 512, which is the total number of cores. On the other hand, as illustrated in FIG. 3B, in the case of the GPGPU 101 having two defective cores, the thread interval w is 510, which is the number of normal cores. Therefore, when the thread interval w for which the processing time is substantially the same is the same as the total number of cores, there is no defective core existing in the GPGPU 101, and thus the GPGPU 101 as the test target, can be determined to pass this test. On the other hand, when the thread interval w for which the processing time is substantially the same is less than the total number of cores, one or more defective cores exist in the GPGPU 101, and thus the GPGPU 101 as the test target can be determined to fail this test.

Figure 6:
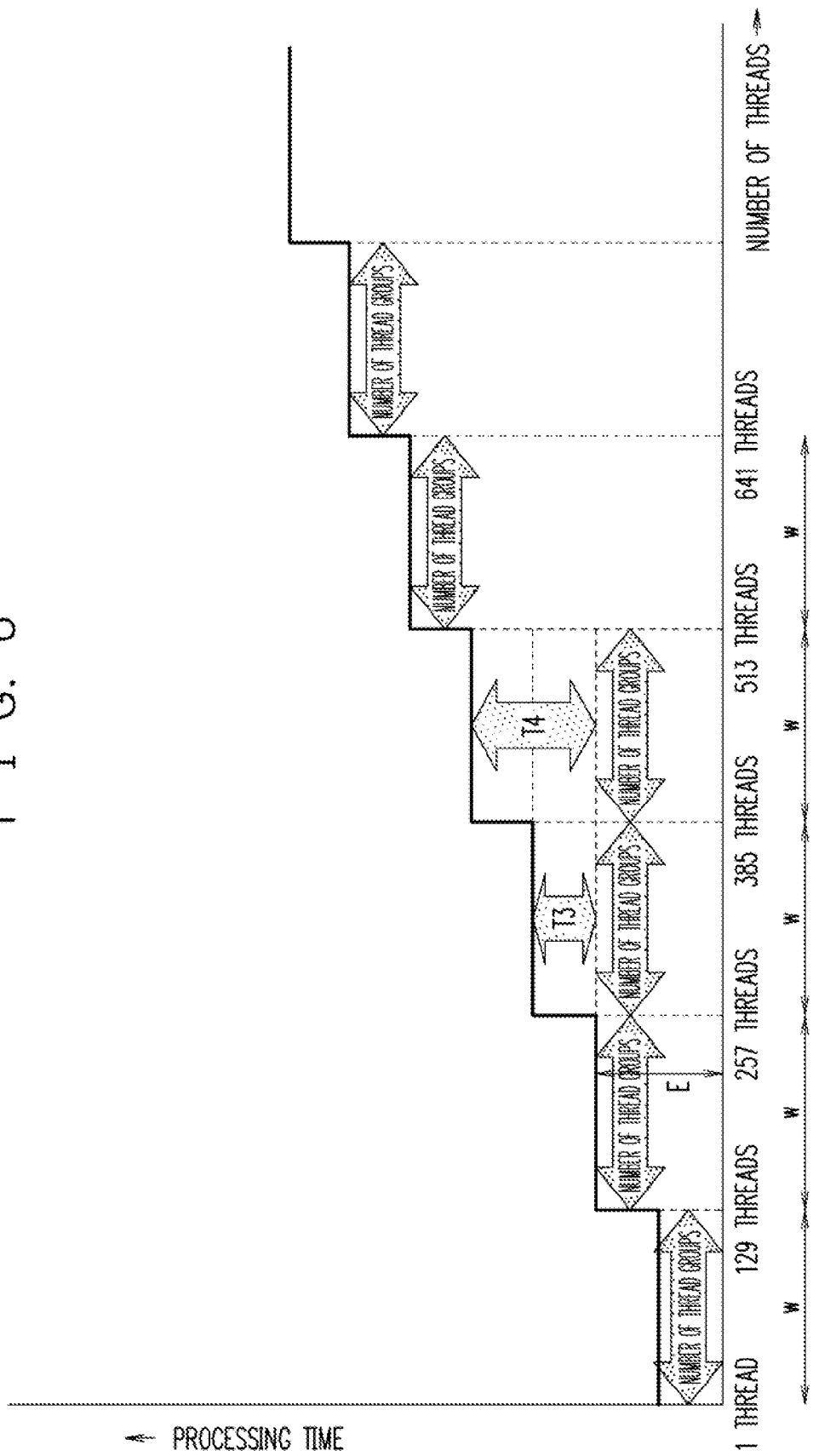
FIG. 6 is a diagram illustrating the processing time of each number of threads of the GPGPU of a method to process threads in units of thread groups.

FIG. 6 is a diagram illustrating the processing time of each number of threads of the GPGPU 101 of the method to process threads in units of thread groups 131 (FIG. 1). In the case of this method, the GPGPU 101 has 128 thread groups 131 as described above, and the scan simultaneously parallel process up to 128 threads 301 at a maximum. Therefore, processing times of 1 to 128 threads 301 are substantially the same, processing times of 129 to 256 threads 301 are substantially the same, processing times of 257 to 384 threads 301 are substantially the same, processing times of 385 to 512 threads 301 are substantially the same, and processing times of 513 to 640 threads 301 are substantially the same.

The processing time of 129 to 256 threads 301 is about two times the processing time of 1 to 128 threads 301. Further, the increased processing time T4 of 385 to 512 threads 301 is about two times the increased processing time T3 of 257 to 384 threads 301. Here, the increased processing time T4 of 385 to 512 threads 301 is a time obtained by subtracting the processing time E of 129 to 256 threads 301 from the processing time of 385 to 512 threads 301. Further, the increased processing time T3 of the 257 to 384 threads 301 is a time obtained by subtracting the processing time E of 129 to 256 threads 301 from the processing time of 257 to 384 threads 301.

As described above, as the number of threads 301 increases, the processing time varies largely at cycles of thread intervals w. In the case of the GPGPU 101 having no defective thread group (defective core), a thread interval w is 128, which is the total number of thread groups. On the other hand, in the case of the GPGPU 101 having two defective thread groups, the thread interval w is 126, which is the number of normal thread groups. Therefore, when the thread interval w for which the processing time is substantially the same is the same as the total number of thread groups, there is no defective thread group (defective core) existing in the GPGPU 101, and thus the GPGPU 101 as the test target can be determined to pass this test. On the other hand, when the thread interval w for which the processing time is substantially the same is less than the total number of thread groups, one or more defective thread groups (defective cores) exist in the GPGPU 101, and thus the GPGPU 101 as the test target can be determined to fail this test.

First, the test apparatus obtains the maximum number of processing units with which the GPGPU 101 as the test target can simultaneously parallel process a plurality of threads 301. As illustrated in FIG. 5, in the case of the method to process threads 301 in units of cores, the above maximum number of processing units which can simultaneously parallel process is the total number of cores 121 in the GPGPU 101, On the other hand, as illustrated in FIG. 6, in the case of the method to process threads 301 in units of thread groups, the above maximum number of processing units which can simultaneously parallel process is the total number of thread groups 131 in the GPGPU 101. Further, as illustrated in FIG. 5 and FIG. 6, the test apparatus makes the GPGPU 101 as the test target perform parallel processing while the number of threads 301 is varied sequentially, so as to obtain the processing time of each of the numbers of threads 301. Then, when a change in numbers of threads (thread intervals w) until a variation of the processing time becomes more than or equal to a threshold P when the number of threads 301 is changed matches the maximum number of processing units which can simultaneously parallel process, the test apparatus outputs information indicating that the GPGPU 101 as the test target is normal, or when it does not match, the test apparatus outputs information indicating that the GPGPU 101 is abnormal, as described above.

Here, the threshold P is a minimum calculation performance coefficient P illustrated in FIG. 11, and is 1.2 or 1.3 for example. In FIG. 5 (or FIG. 6), the increased processing time T2 tor T4) and the increased processing time T1 (or T3) are compared. When T2/T1 (or T4/T3) is more than or equal to the threshold P, it means the end of the thread interval w, and when T2/T1 (or T4/T3) is less than the threshold P, it means that the thread interval w has not ended yet.

Further, the test apparatus determines whether or not the change in numbers of threads 301 (thread intervals w) matches the maximum number of processing units which can simultaneously parallel process every time the variation of the processing time becomes more than or equal to the threshold P. When all thread intervals w match the maximum number of processing units which can simultaneously parallel process, the test apparatus outputs information indicating that the GPGPU 101 as the test target is normal, or when the thread intervals w does not match the maximum number of processing units which can simultaneously parallel process at least once, the test apparatus outputs information indicating that the GPGPU 101 as the test target is abnormal. By performing the test for each of the plurality of thread intervals w, as compared to the test of one thread interval w, it is possible to perform the test under more strict conditions, so as to increase test accuracy and improve the detection rate of defective cores.

Figure 7:
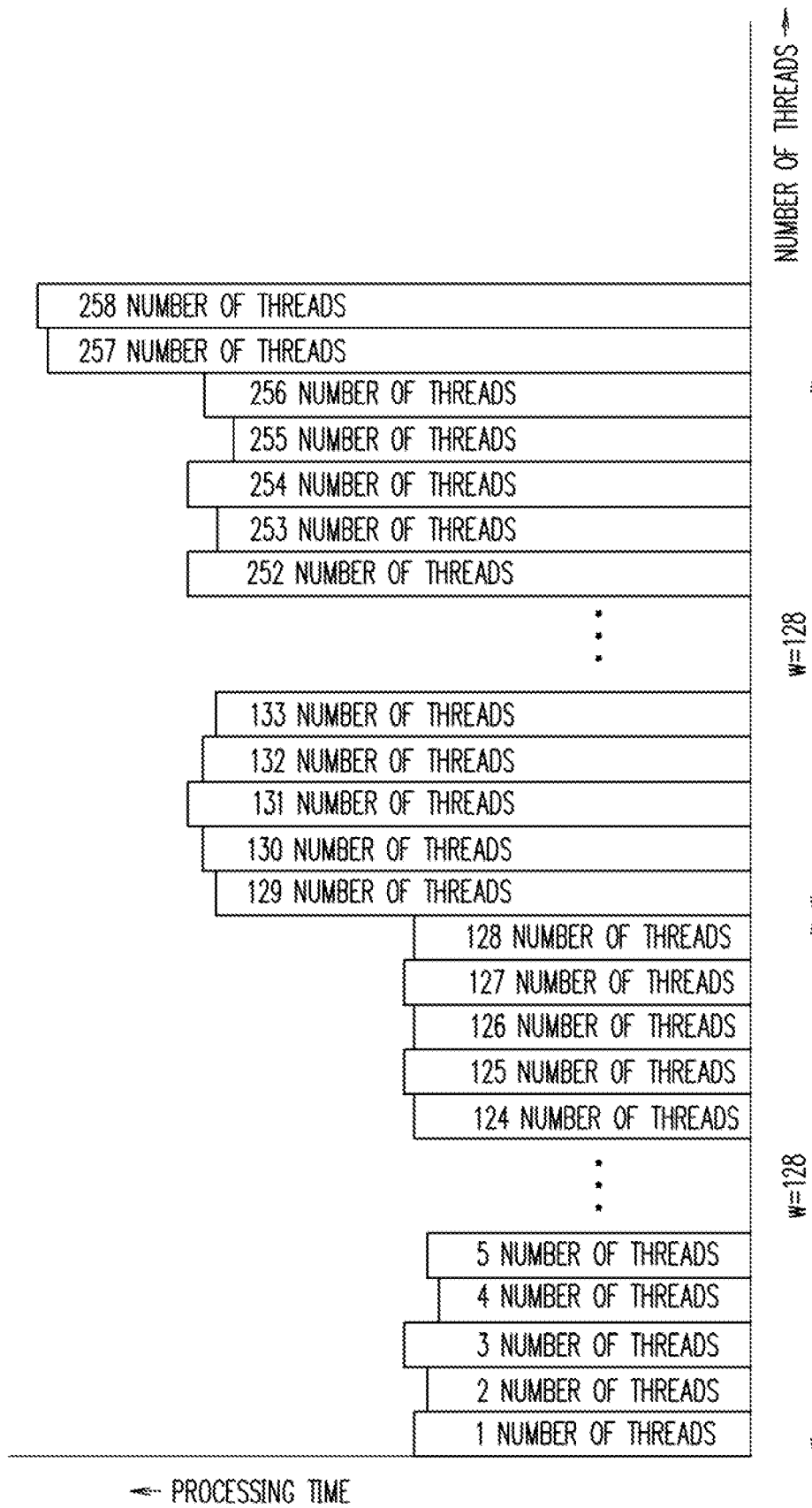
FIG. 7 is a diagram illustrating a specific example of the processing time of each number of threads of the GPGPU having no defective thread group.

FIG. 7 is a diagram corresponding to FIG. 6 and illustrating a specific example of the processing time of each number of threads of the GPGPU 101 having no defective thread group. First, the processing time of one thread and the processing time of two threads are compared, and the value obtained by dividing the processing time of two threads by the processing time of one thread is less than the minimum calculation performance coefficient P (for example, 1.3 in FIG. 11). Thus, there is almost no change in the processing times, and they can be determined to be within the range of the thread interval w. Next, similarly, the processing time of two threads and the processing time of three threads are compared, and the value obtained by dividing the processing time of three threads by the processing time of two threads is less than the minimum calculation performance coefficient P. Thus, there is almost no change in the processing times, and they can be determined to be within the range of the thread interval w. Similarly, up to the processing time of 128 threads, there is almost no change in the processing times, and they can foe determined to be within the thread interval w.

Next, the processing time of 128 threads and the processing time of 129 threads are compared, and the value obtained by dividing the processing time of 129 threads by the processing time of 128 threads is more than or equal to the minimum calculation performance coefficient P. Thus, the processing times increase rapidly, and they can be determined to be out of the range of the thread interval w. This means the end of the thread interval w, and thus the thread interval w can be determined as 128. Then, this thread interval w is the same as 128, which is the total number of thread groups 131 in the GPGPU 101, and thus the GPGPU 101 can be determined as normal.

Next, the processing time of 129 threads and the processing time of 130 threads are compared, and the value obtained by dividing the value obtained by subtracting the processing time of 128 threads from the processing time of 130 threads by the value obtained by subtracting the processing time of 128 threads from the processing time of 129 threads is less than the minimum calculation performance coefficient P. Thus, there is almost no change in the processing times, and they can be determined to be within the range of the thread interval w.

At this moment, the above processing time of 128 threads corresponds to the processing time E of FIG. 6. Further, the value obtained by subtracting the processing time of 128 threads from the above processing time of 130 threads corresponds to the increased processing time T4 of FIG. 6. The value obtained by subtracting the processing time of 128 threads from the processing time of 129 corresponds to the increased processing time T3 of FIG. 6. Then, the above description means that it is determined whether T4/T3 is less than the minimum calculation performance coefficient P or not.

Next, similarly, the processing time of 130 threads and the processing time of 131 threads are compared. Up to the processing time of 256 threads, there is almost no change in the processing times, and they can be determined to be within the range of the thread interval w.

Next, the processing time of 256 threads and the processing time of 257 threads are compared, and the value obtained by dividing the value obtained by subtracting the processing time of 128 threads from the processing time of 257 threads by the value obtained by subtracting the processing time of 128 threads from the processing time of 256 threads is more than or equal to the minimum calculation performance coefficient P. Thus, the processing times increase rapidly, and they can be determined to be out of the thread interval w. This means the end of the thread interval w, and thus the thread interval w can be determined as 256−128=128. Then, this thread interval w is the same as 128, which is the total number of thread groups 131 in the GPGPU 101, and thus the GPGPU 101 can be determined as normal.

Next, the processing time of 257 threads and the processing time of 258 threads are compared, and the value obtained by dividing the value obtained by subtracting the processing time of 256 threads from the processing time of 258 threads by the value obtained by subtracting the processing time of 256 threads from the processing time of 257 threads is less than the minimum calculation performance coefficient P. Thus, there is almost no change in the processing times, and they can be determined to be within the range of the thread interval w. Thereafter, the same processing is repeated.

Figure 8:
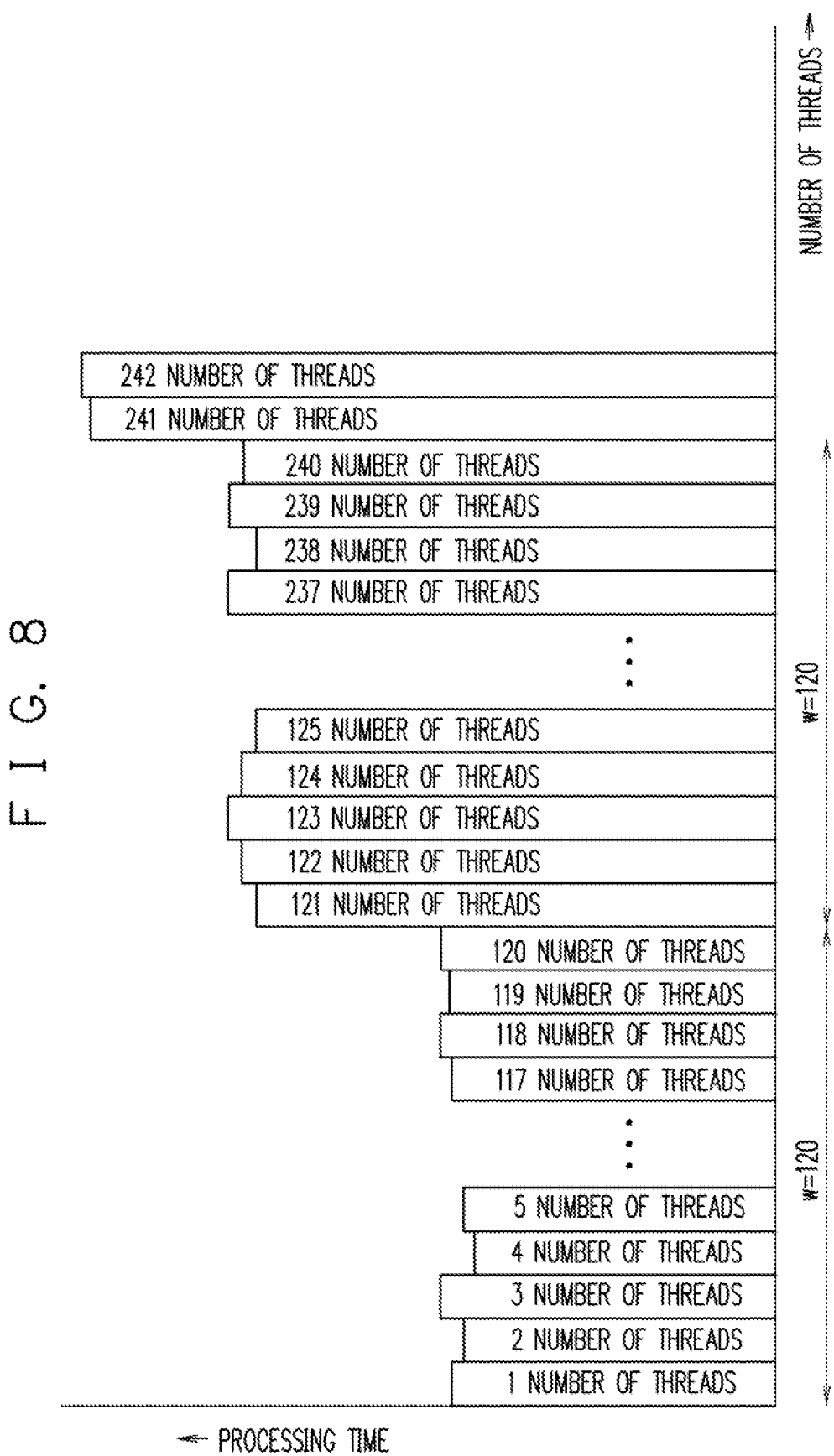
FIG. 8 is a diagram illustrating a specific example of the processing time of each number of threads of the GPGPU having defective thread groups.

FIG. 8 is a diagram corresponding to FIG. 6 and illustrating a specific example of the processing time of each number of threads of the GPGPU 101 having defective thread groups. By processing similar to FIG. 7, for example, a rapid increase in processing time is detected between the processing time of 120 threads and the processing time of 121 threads, and a rapid increase in processing time is detected between the processing time of 240 threads and the processing time of 241 threads. Thus, it can be determined that the thread interval w is 120−0=120 (and 240−120−120). Then, this thread interval w is smaller by 8 than 128, which is the total number of thread groups 131 in the GPGPU 101, and thus it can be determined that the GPGPU 101 has eight defective thread groups 131.

FIG. 9 is a diagram illustrating a structural example of a test system according to this embodiment. A test apparatus 901 is a computer such as a server or a personal computer for example, to which a keyboard 902 and a display device 903 are connected. The test apparatus 901 has the CPU 911, a main memory 912, a storage device 913, an input device interface 914, an output device interface 915, an input/output interface slot 916, and a bus 917. The CPU 911 is connected to the storage device 913, the input device interface 914, the output device interface 915, and the input/output interface slot 916 via the bus 917. The main memory 912 is connected to the CPU 911. The keyboard 902 is connected to the input device interface 914. The display device 903 is connected to the output device interface 915. The storage device 913 is, for example, a hard dish drive device. The input/output interface slot 916 is, for example, an input/output serial interface of PCI-Express (Peripheral Component Interconnect-Express). The CPU 911 is a processor performing various calculations or processing. By inserting the GPGPU 101 as the test target into the input/output interface slot 916, the test apparatus 901 can perform a test of the GPGPU 101. The GPGPU 101 has a memory 112, similarly to FIG. 1. The CPU 911 executes a program in the main memory 912, so as to perform the test of the GPGPU 101. The keyboard 902 is an input device used for starting a program for performing a test, or the like. The display device 903 is an output device performing display of a test result, or the like.

This embodiment can be achieved by a computer executing a program. Further, this embodiment, can also be applied to a computer readable recording medium which records the program and a computer program product such as a program. The recording medium is, for example, a flexible disk, a hard disk, an optical disk, a magneto-optical disk, a CD-ROM (Compact Disc Read Only Memory), a magnetic tape, a non-volatile memory card, a ROM (Read Only Memory), or the like.

Figure 10:
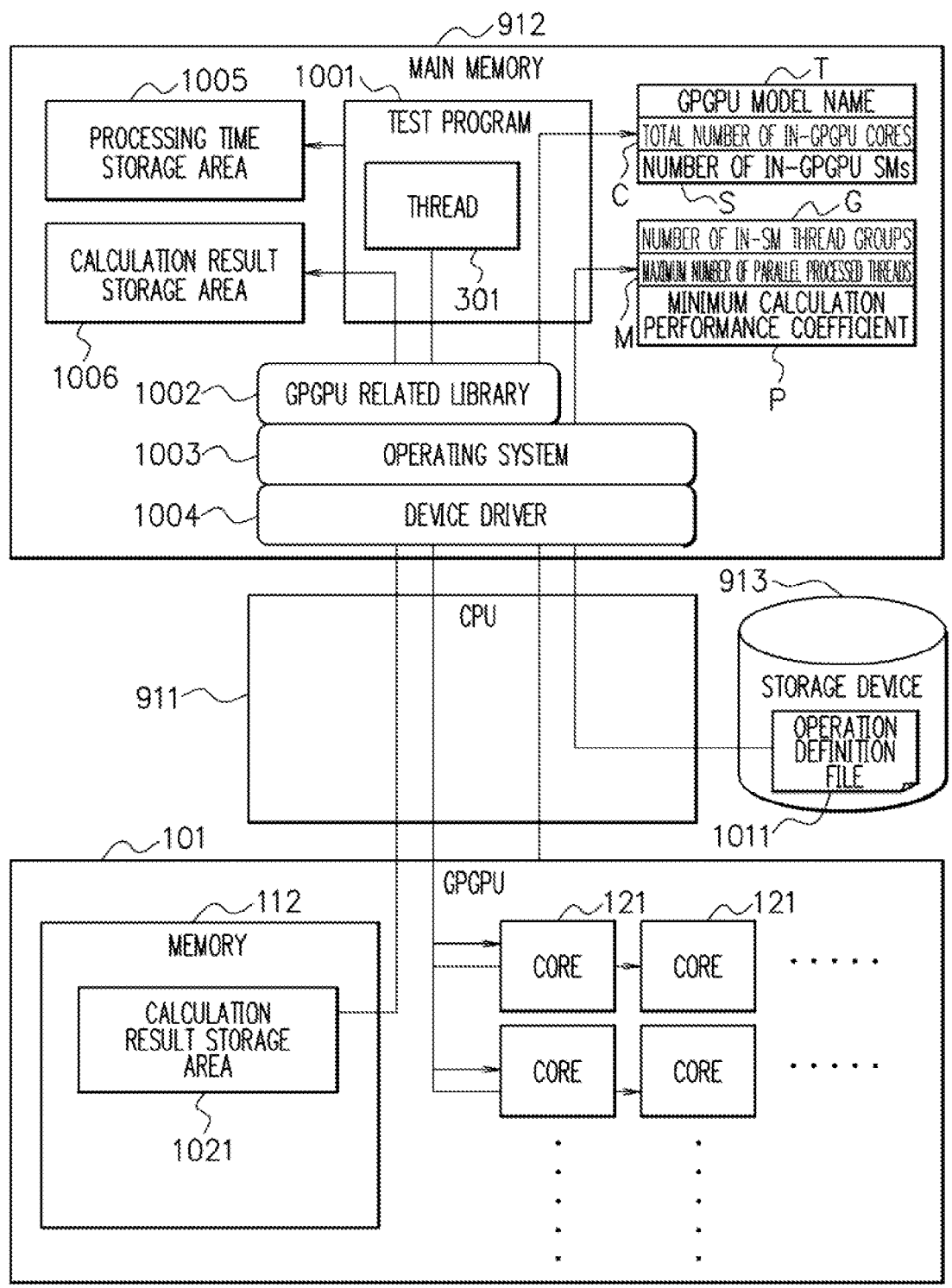
FIG. 10 is a diagram illustrating a detailed example of part of the test system of FIG. 9.

FIG. 10 is a diagram illustrating a detailed example of part of the test system of FIG. 9. The main memory 912 has a processing time storage area 1005 and a calculation result storage area 1006, and stores a test program 1001, a related library 1002 for the GPGPU 101, an operating system (OS) 1003, and a device driver 1004. The main memory 912 further stores a GPGPU model name T, the total number of in-GPGPU cores C, the number of in-GPGPU SMs S, the number of in-SM thread groups G, the maximum number of parallel processed threads M, and the minimum calculation performance coefficient P. The test, apparatus 901 uses an application programming interface (API) provided by the vendor of the GPGPU 101 to perform input and output by the test program 1001 to and from the GPGPU 101. The storage device 913 stores an operation definition file 1011. Details of the operation definition file 1011 will be described later with reference to FIG. 11. The GPGPU 101 has a plurality of cores 121 and a memory 112, similarly to FIG. 1. The memory 112 has a calculation result storage area 1021. A calculation result of the cores 121 is written in the calculation result storage area 1021.

FIG. 11 is a diagram illustrating an example of contents of the operation definition file 1011 in the storage device 913 of FIG. 10. The operation definition file 1011 stores the number of in-SM thread groups G, the maximum number of parallel processed threads 11, and the minimum calculation performance coefficient P for each GPGPU model name T. The GPGPU model name T is the model name of the GPGPU 101 which is testable. The number of in-SM thread groups G is the number of thread groups 131 in each SM 111 (FIG. 1), and is 8 in the case of FIG. 1 and FIG. 6, and 0 in the case of FIG. 1 and FIG. 5 because there is no thread group 131. The maximum number of parallel processed threads M corresponds to the maximum number of parallel processed threads M of FIG. 4, and the processing time of the number of threads from 0 to M is measured. Regarding the minimum calculation performance coefficient P, the processing time of each number of threads is compared as described above, and when there is a variation of the processing time more than or equal to the minimum calculation performance coefficient P, this means the end of the thread interval w.

Figure 12:
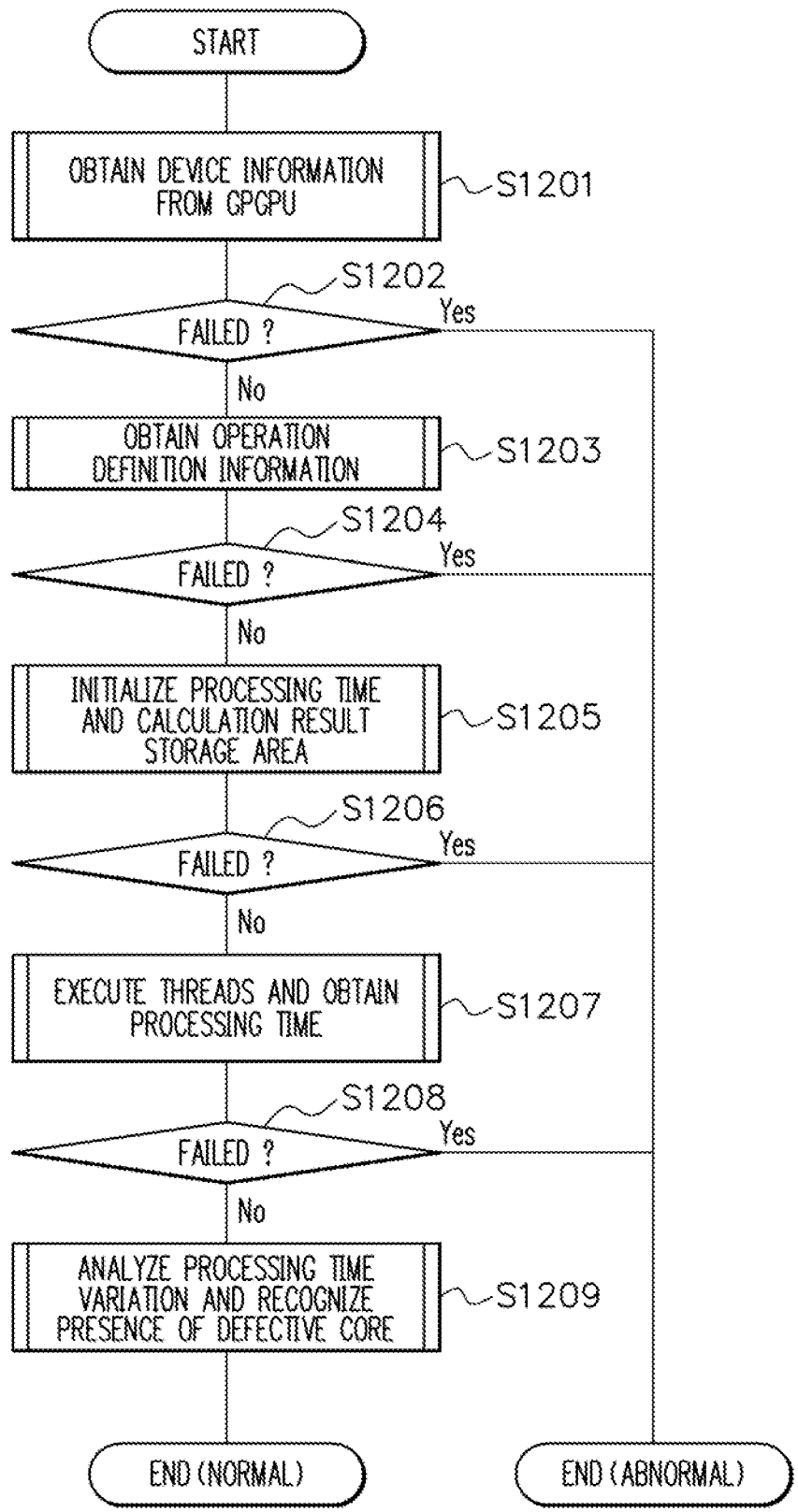
FIG. 12 is a flowchart illustrating a test method of a test apparatus of FIG. 9.

FIG. 12 is a flowchart illustrating a test method of the test apparatus 901 of FIG. 9. The test apparatus 901 performs processing of FIG. 12 by the CPU 911 executing the test program 1001 in the main memory 912.

First, in step S1201, the test apparatus 901 obtains device information from the GPGPU 101. The device information includes the GPGPU model name T, the total number of in-GPGPU cores C, and the number of in-GPGPU SMs S of FIG. 10. Details of this processing will be described later with reference to FIG. 13.

Next, in step S1202, the test apparatus 901 ends abnormally when the processing of step S1201 ends abnormally, or proceeds to step S1203 when the processing of step S1201 ends normally.

Next, in step S1203, the test apparatus 901 obtains operation definition information from the operation definition file 1011 in the storage device 913. The operation definition information includes, as illustrated in FIG. 10 and FIG. 11, the number of in-SM thread groups G, the maximum number of parallel processed threads M, and the minimum calculation performance coefficient P. Details of this processing will be described later with reference to FIG. 14.

Next, in step S1204, the test apparatus 901 ends abnormally when the processing of step S1203 ends abnormally, or proceeds to step S1205 when the processing of step S1203 ends normally.

Next, in step S1205, the test apparatus 901 initializes the processing time storage area 1005 and the calculation result storage area 1006 in the main memory 912. Details of this processing will be described later with reference to FIG. 15.

Next, in step S1206, the test apparatus 901 ends abnormally when the processing of step S1205 ends abnormally, or proceeds to step S1209 when the processing of step S1205 ends normally.

Next, in step S1207, the test apparatus 901 changes the number of threads 301 and instructs the GPGPU 101 to execute parallel processing, and obtains the processing time of every number of threads 301. Details of this processing will be described later with reference to FIG. 16.

Next, in step S1208, the test apparatus 901 ends abnormally when the processing of step S1207 ends abnormally, or proceeds to step S1209 when the processing of step S1207 ends normally.

Next, in step S1209, the test apparatus 901 analyzes a variation of the processing time of every number of threads 301, and recognizes presence of defective core in the GPGPU 101. Details of this processing will be described later with reference to FIG. 17, Thereafter, the test apparatus 901 ends the processing of FIG. 12 normally.

Figure 13:
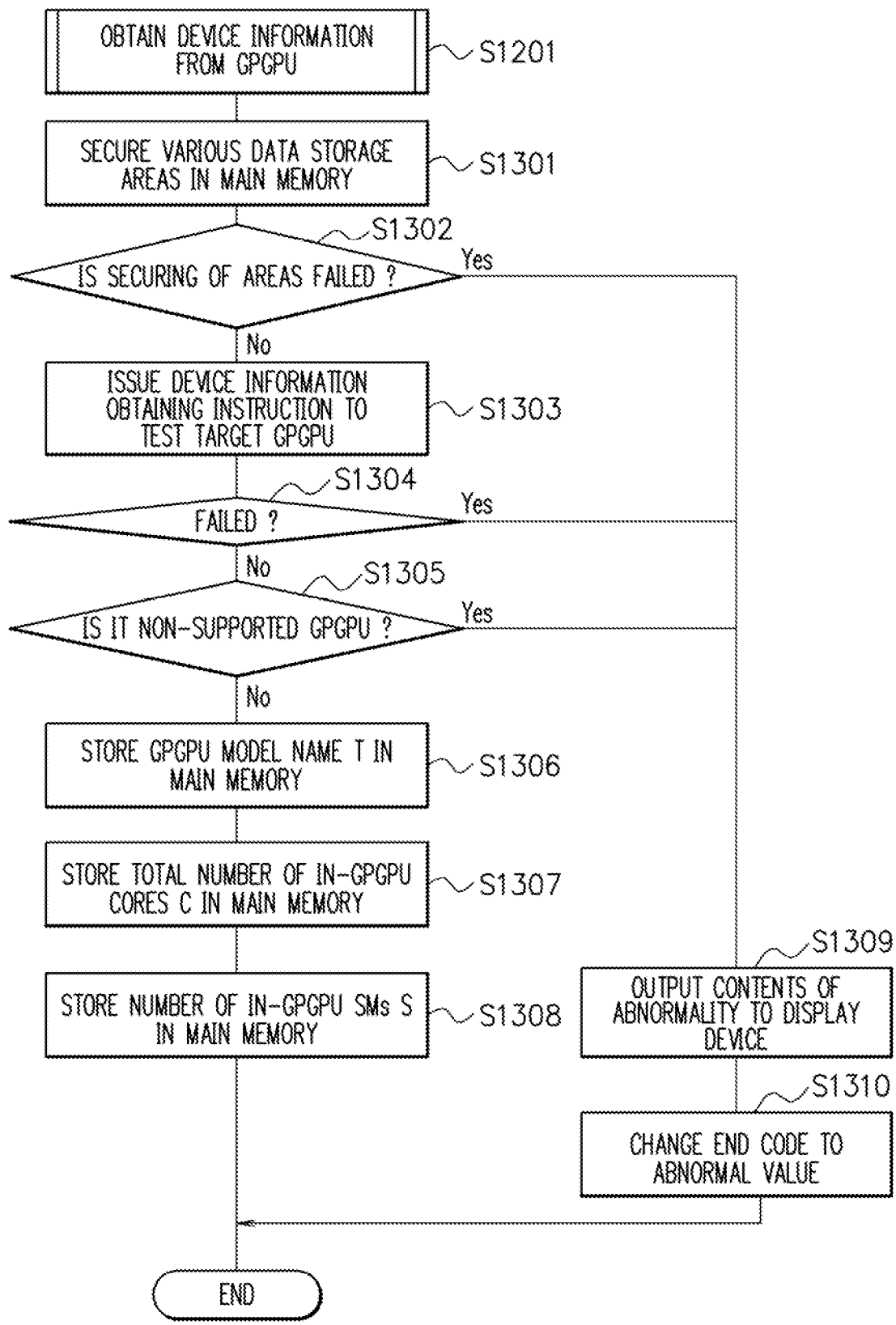
FIG. 13 is a flowchart illustrating details of processing of step S1201 of FIG. 12.

FIG. 13 is a flowchart illustrating details of the processing of step S1201 of FIG. 12. First, in step S1301, the test apparatus 901 secures areas for storing the GPGPU model name T, the total number of in-GPGPU cores C, and the number of in-GPGPU SMs S in the main memory 912.

Next, in step S1302, the test apparatus 901 determines whether the securing of areas in the processing of step S1301 is failed or not. The test apparatus 901 proceeds to step S1303 when the securing of are as is succeeded, or proceeds to step S1309 when the securing of areas is failed.

Next, in step S1303, the test apparatus 901 issues a device information obtaining instruction to the GPGPU 101 as the test target, and obtains device information from the GPGPU 101. This device information includes the GPGPU model name T, the total number of in-GPGPU cores C, and the number of in-GPGPU SMs S.

Next, in step S1304, the test apparatus 901 proceeds to step S1305 when normal device information is inputted from the GPGPU 101, or proceeds to step S1309 when error information is inputted from the GPGPU 101.

Next, in step S1305, when the GPGPU model name T in the inputted device information exists in the operation definition file 1011 (FIG. 11) in the storage device 913, the test apparatus 901 determines that it is a testable GPGPU 101 and proceeds to step S1306. When the GPGPU model name T in the inputted device information does not exist, in the operation definition file 1011 (FIG. 11) in the storage device 913, the test apparatus 901 determines that it is a non-testable GPGPU 101 and proceeds to step S1309.

Next, in step S1306, the test apparatus 901 stores in the main memory 912 the GPGPU model name T in the inputted device information.

Next, in step S1307, the test apparatus 901 stores in the main memory 912 the total number of in-GPGPU cores C in the inputted device information. For example, in the case of FIG. 1, since the GPGPU 101 has 16 SMs 111 and each SM 111 has 32 cores 121, the total number of in-GPGPU cores C is 16×32=512.

Next, in step S1308, the test apparatus 901 stores in the main memory 912 the number of in-GPGPU SMs S in the inputted device information. For example, in the case of FIG. 1, since the GPGPU 101 has 16 SMs 111, the number of in-GPGPU SMs S is 16. Thereafter, the test apparatus 901 ends the processing of FIG. 13 and proceeds to step S1203 via step S1202 of FIG. 12.

In step S1309, the test apparatus 901 outputs the contents of abnormality in above step S1302, S1304, or S1305 to the display device 903 to have the contents displayed. Next, in step S1310, the test apparatus 901 changes the end code to an abnormal value. Thereafter, the test apparatus 901 ends the processing of FIG. 13 and ends abnormally via step S1202 of FIG. 12.

Figure 14:
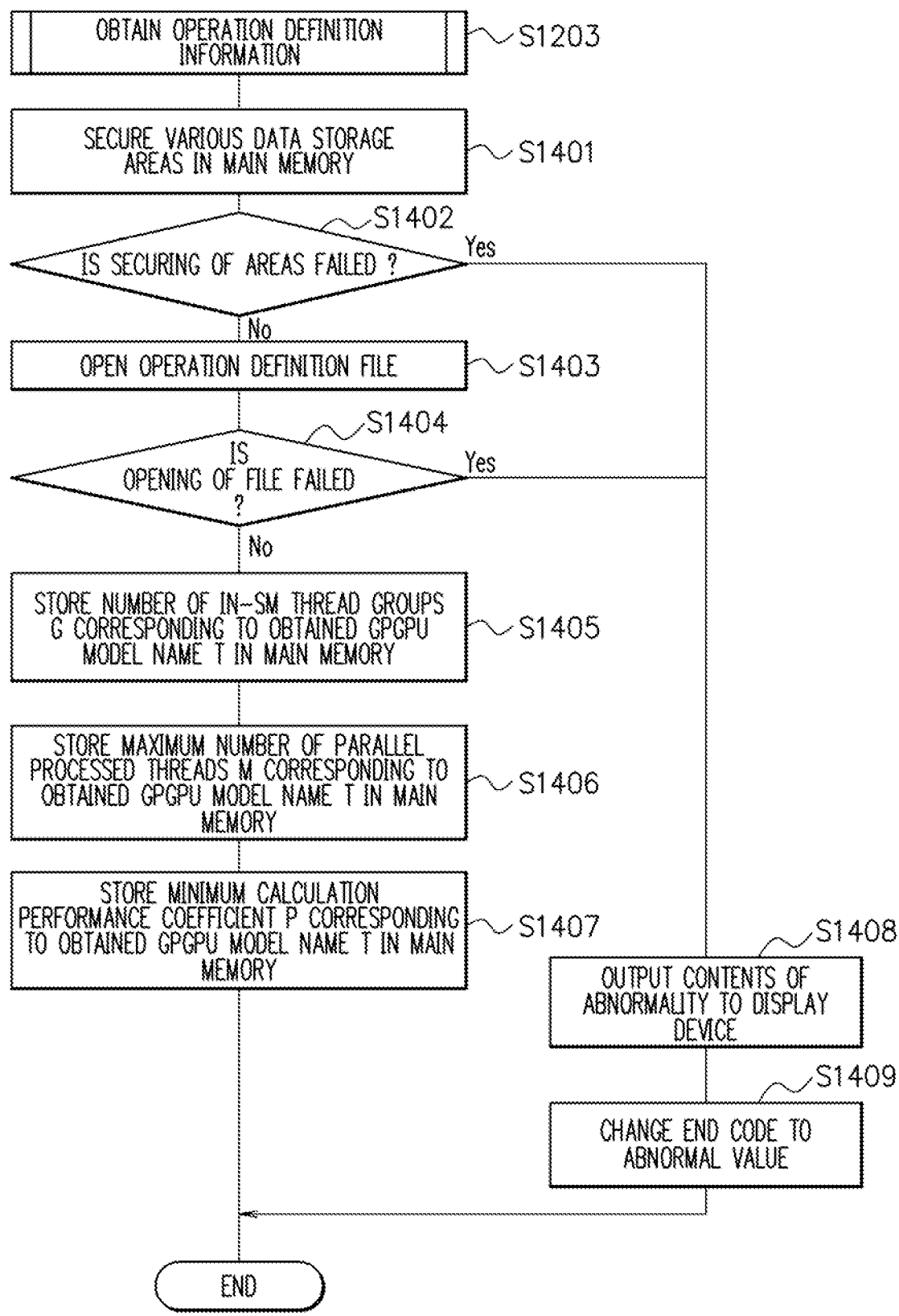
FIG. 14 is a flowchart illustrating details of processing of step S1203 of FIG. 12.

FIG. 14 is a flowchart illustrating details of the processing of S1203 of FIG. 12. First, in step S1401, the test apparatus 901 secures areas for storing the number of in-SM thread groups G, the maximum number of parallel processed threads M, and the minimum calculation performance coefficient F in the main memory 912.

Next, in step S1402, the test apparatus 901 determines whether the securing of areas in the processing of step S1401 is failed or not. The test, apparatus 901 proceeds to step S1403 when the securing of areas is succeeded, or proceeds to step S1408 when the securing of areas is failed.

Next, in step S1403, the test apparatus 901 opens the operation definition file 1011 (FIG. 11) in the storage device 913.

Next, in step S1404, the test apparatus 901 proceeds to step S1405 when the opening of file is succeeded in the processing of step S1403, or proceeds to step S1408 when the opening of file is failed.

Next, in step S1405, the test apparatus 901 refers to the operation definition file 1011 of FIG. 11, reads the number of in-SM thread groups G corresponding to the GPGPU model name T obtained in step S1306 of FIG. 13, and stores the read number of in-SM thread groups G in the main memory 912.

Next, in step S1406, the test apparatus 901 refers to the operation definition file 1011 of FIG. 11, reads the maximum number of parallel processed threads M corresponding to the GPGPU model name T obtained in step S1306 of FIG. 13, and stores the read maximum number of parallel processed threads M in the main memory 912.

Next, in step S1407, the test apparatus 301 refers to the operation definition file 1011 of FIG. 11, reads the minimum calculation performance coefficient P corresponding to the GPGPU model name T obtained in step S1306 of FIG. 13, and stores the read minimum calculation performance coefficient F in the main memory 912. Thereafter, the test apparatus 901 ends the processing of FIG. 14 and proceeds to step S1205 via step S1204 of FIG. 12.

In step S1408, the test apparatus 901 outputs the contents of abnormality in above step S1402 or S1404 to the display device 903 to have the contents displayed. Nest, in step S1409, the test apparatus 901 changes the end code to an abnormal value. Thereafter, the test apparatus 901 ends the processing of FIG. 14 and ends abnormally via step S1204 of FIG. 12.

Figure 15:
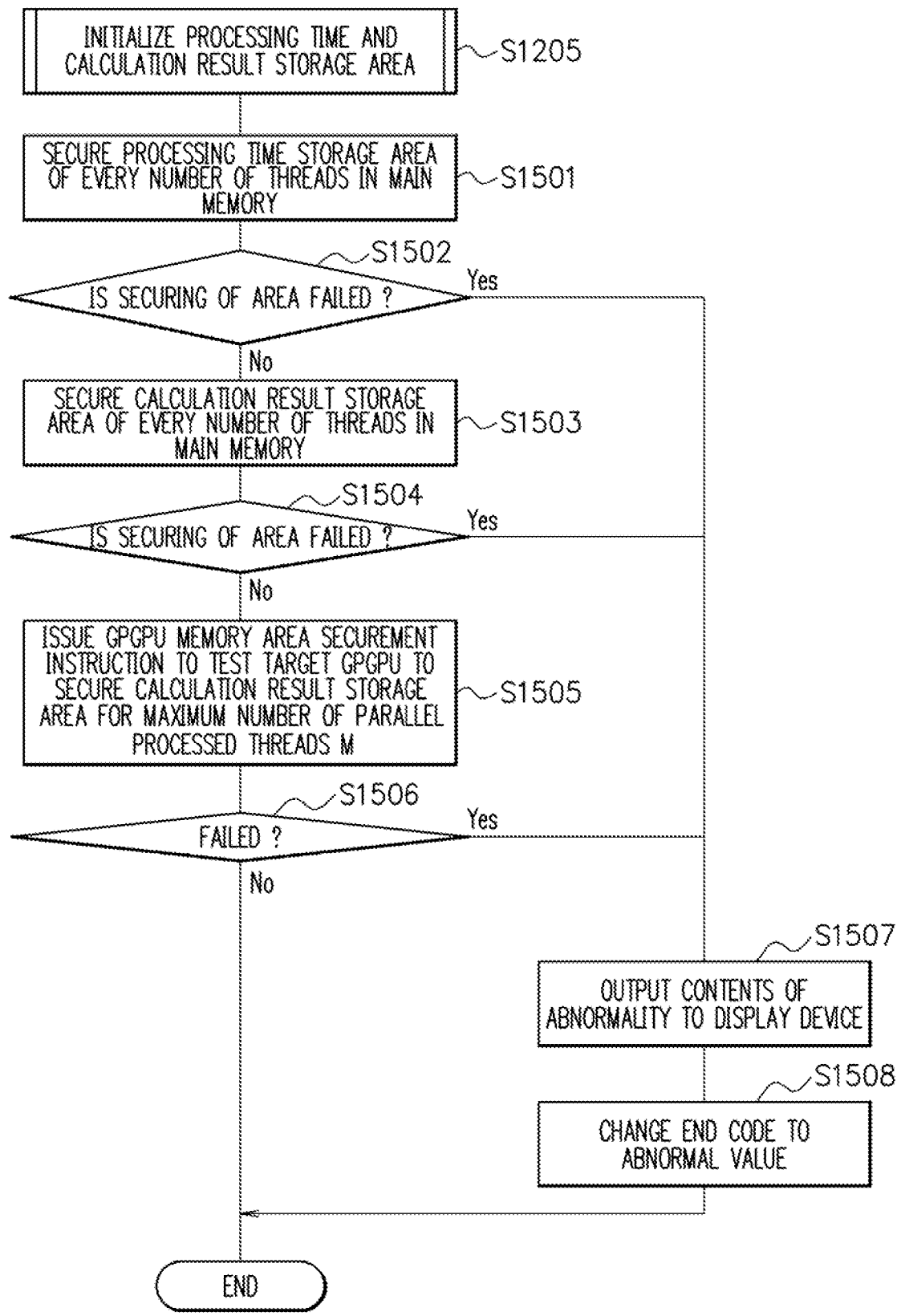
FIG. 15 is a flowchart illustrating details of processing of step S1205 of FIG. 12.

FIG. 15 is a flowchart illustrating details of the processing of step S1205 of FIG. 12. First, in step S1501, the test apparatus 901 secures a processing time storage area 1005 for storing the processing time for every number of threads in the main memory 912.

Next, in step S1502, the test apparatus 901 determines whether the securing of area in the processing of step S1501 is failed or not. The test apparatus 901 proceeds to step S1503 when the securing of area is succeeded, or proceeds to step S1507 when the securing of area is failed.

Next, in step S1503, the test apparatus 901 secures the calculation result storage area 1006 for storing a calculation result of the GPGPU 101 of every number of threads in the main memory 912.

Next, in step S1504, the test apparatus 901 determines whether the securing of area in the processing of step S1503 is failed or not. The test apparatus 901 proceeds to step S1505 when the securing of area is succeeded, or proceeds to step S1507 when the securing of area is failed.

Next, in step S1505, the test apparatus 901 issues a memory area securement instruction for the calculation result storage area 1021 in the memory 112 of the GPGPU 101 to the GPGPU 101 as the test target to make it secure the calculation result storage area 1021 for storing a calculation result of the maximum number of parallel processed threads M obtained in step S1406 of FIG. 14.

Next, in step S1506, the test apparatus 901 proceeds to step S1507 when information indicating that the processing of step S1505 is failed is inputted from the GPGPU 101, or ends the processing of FIG. 15 when information indicating that, the processing of S1505 is succeeded is inputted from the GPGPU 101, and proceeds to step S1207 via step S1206 of FIG. 12.

In step S1507, the test apparatus 901 outputs the contents of abnormality in above step S1502, S1504, or S1506 to the display device 903 to have the contents displayed. Next, in step S1508, the test apparatus 901 changes the end code to an abnormal value. Thereafter, the test apparatus 901 ends the processing of FIG. 15 and ends abnormally via step S1206 of FIG. 12.

Figure 16:
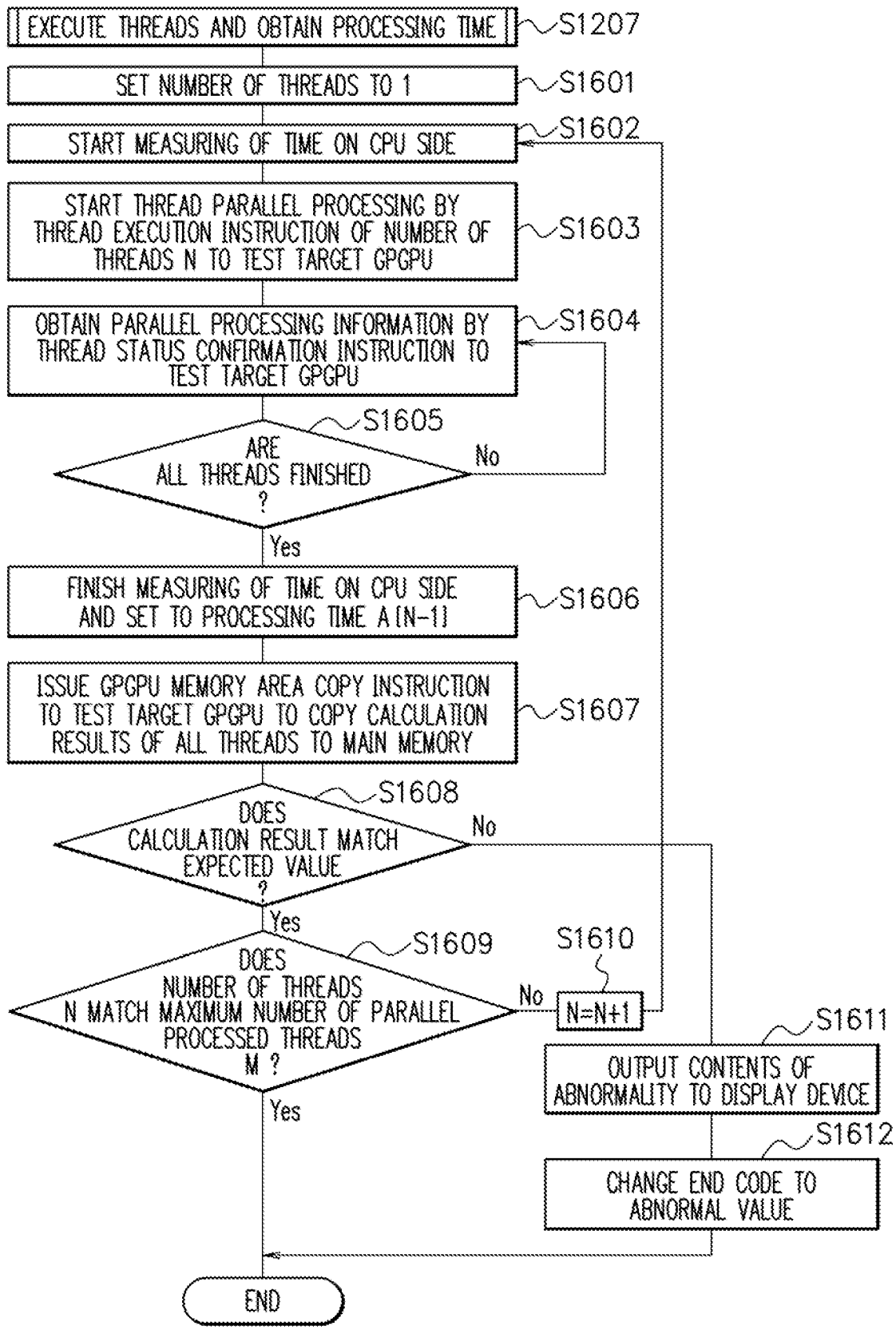
FIG. 16 is a flowchart illustrating details of processing of step S1207 of FIG. 12.

FIG. 16 is a flowchart illustrating details of the processing of step S1207 of FIG. 12. First, in step S1601, the test apparatus 901 sets the number of threads N to 1, which is a variable.

Next, in step S1602, the test apparatus 901 starts to measure the processing time of the GPGPU 101 by the CPU 911.

Next, in step S1603, the test apparatus 901 issues a thread execution instruction for the number of threads N to the GPGPU 101 as the test target, so as to start parallel processing of the number of threads N. The GPGPU 101 starts parallel processing of the number of threads N and, when the processing finishes, writes a calculation result of threads in the calculation result storage area 1021 in the memory 112.

Next, in step S1504, the test apparatus 901 issues a thread status confirmation instruction to the GPGPU 101 as the test target, and obtains parallel processing information of the GPGPU 101. This parallel processing information includes information of whether processing of threads is finished or not.

Next, in step S1605, the test apparatus 901 determines whether processing of all the number of threads N is finished or not based on the parallel processing information of step S1604. The test apparatus 901 proceeds to step S1606 when it is finished, or returns to step S1604 and repeats the above processing when it is not finished.

In step S1606, the test apparatus (processing time obtaining unit) 901 finishes measuring of the processing time of the GPGPU 101 by the CPU 911, and sets the time from start of measuring in step S1602 to finish of measuring in step S1606 to the processing time A[N−1] as the processing time of the number of threads N of the GPGPU 101. The processing time A[N−1] is an array variable in the processing time storage area 1005 in the main memory 912 of FIG. 10. For example, the processing time A[0] indicates the processing time of one thread, and the processing time A[1] indicates the processing time of two threads.

Next, in step S1607, the test apparatus 901 issues to the GPGPU 101 as the test target a memory area copy instruction for copying a calculation result of the GPGPU 101 stored in the calculation result storage area 1021 in the memory 112 of the GPGPU 101 to the calculation result storage area 1006 in the main memory 912 of the test apparatus 901, and copies the calculation result of all the number of threads K from the calculation result storage area 1021 of the GPGPU 101 to the calculation result storage area 1006 of the test apparatus 901.

Next, in step S1608, the test apparatus 901 determines whether the calculation result of all the threads in the calculation result storage area 1006 matches an expected value or not. When the calculation result of all the threads matches the expected value, this means that the calculation result is correct and hence the test apparatus 901 proceeds to step S1609, or when the calculation result of at least part of the threads does not match the expected value, this means that the calculation result is wrong, and hence the test apparatus 901 proceeds to step S1611.

Next, in step S1609, the test apparatus 901 determines whether the number of threads N matches the maximum number of parallel processed threads M or not. The number of threads K is initially set to 1 in above step S1406 of FIG. 14. The maximum number of parallel processed threads M is the maximum number of parallel processed threads M (FIG. 11) set in above step S1406 of FIG. 14. When the both numbers do not match, this means that processing of all the number of threads has not finished yet, and hence the test apparatus 901 proceeds to step S1610, or when the both numbers match, this means that the processing of all the number of threads has finished, and hence the test apparatus 901 ends the processing of FIG. 16 and proceeds to step S1209 via step S1208 of FIG. 12.

In step S1610, the test apparatus 901 increases the number of threads H by 1 and returns to above step S1602, and repeats processing of the increased number of threads N. When processing up to the maximum number of parallel processed threads M finishes, the processing is finished.

In step S1611, the test apparatus 901 outputs the contents of abnormality in above step S1608 to the display device 903 to have the contents displayed. Next, in step S1612, the test apparatus 901 changes the end code to an abnormal value. Thereafter, the test apparatus 901 ends the processing of FIG. 16 and ends at a normally via step S1208 of FIG. 12.

Figure 17:
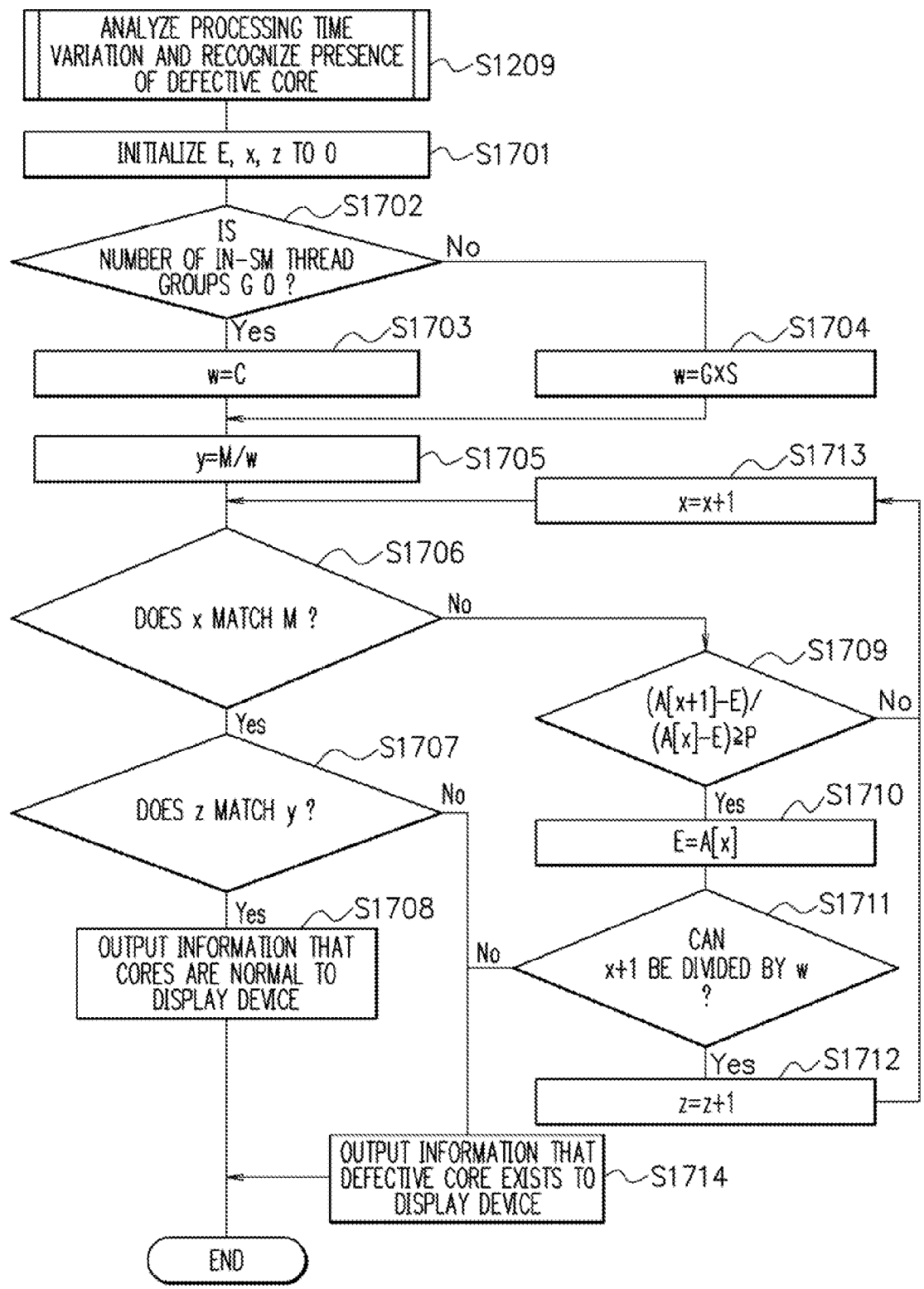
FIG. 17 is a flowchart illustrating details of processing of step S1209 of FIG. 12.

FIG. 17 is a flowchart illustrating details of the processing of step S1209 of FIG. 12. First, in step S1701, the test apparatus 901 initializes a base processing time E, the number of threads x, and the number of times z of processing time variations to 0, which are variables. The base processing time E corresponds to the processing time E of FIG. 5 and FIG. 6. The number of threads x corresponds to the number of threads N−1 of FIG. 16, and the number of threads x=0 corresponds to the number of threads N=1. The number of times z of processing time variations is the number of times the processing time increases rapidly, and means the number of thread intervals w of FIG. 5 or FIG. 6.

Next, in step S1702, the test apparatus 901 determines whether the number of in-SM thread groups G is 0 or not. The number of in-SM thread groups G is the number of in-SM thread groups G (FIG. 11) set in above step S1405 of FIG. 14. When the number of in-SM thread groups G is 0, this means the method to process threads in units of cores as illustrated in FIG. 5, and thus the test apparatus 901 proceeds to step S1703, or when the number of in-SM thread groups G is 1 or more, this means the method to process threads in units of thread groups as illustrated in FIG. 6, and thus the test apparatus 901 proceeds to step S1704.

In step S1703, the test apparatus 901 (processing unit number obtaining unit) 901 sets the total number of in-GPGPU cores C as the thread interval w illustrated in FIG. 5. The thread interval w corresponds to the maximum number of processing units which can simultaneously parallel process a plurality of threads. The total number of in-GPGPU cores C is a numeric value set in above step S1307 of FIG. 13. For example, in the case of FIG. 1 and FIG. 5, since the GPGPU 101 has 16 SMs 111 and each SM 111 has 32 cores 121, the total number of in-GPGPU cores C is 16×32=512. As a result, the thread interval w becomes 512. Thereafter, the test apparatus 901 proceeds to step S1705.

In step S1704, the test apparatus (processing unit number obtaining unit) 901 sets the product of the number of in-SM thread groups G and the number of in-GPGPU SMs S as the thread interval w illustrated in FIG. 6. The thread interval w corresponds to the maximum number of processing units which can simultaneously parallel process a plurality of threads.

The number of in-SM thread groups G is the number of in-SM thread groups G (FIG. 11) set in above step S1405 of FIG. 14. For example, in the case of FIG. 1 and FIG. 6, since each SM 111 has eight thread groups 131, the number of in-SM thread groups G is 8.

Further, the number of in-GPGPU SMs S is the numeric value set in above step S1308 of FIG. 13, For example, in the case of FIG. 1 and FIG. 6, since the GPGPU 101 has 16 SMs 111, the number of in-GPGPU SMs S is 16.

As a result, the thread interval w is G×S=8×16=128. Thereafter, the test apparatus 901 proceeds to step S1705, Processing after step S1705 is processing common to the method to process threads in units of cores of FIG. 5 and the method to process threads in units of thread groups of FIG. 6, and thus can corresponds to both the methods.

In step S1705, the test apparatus 901 sets the quotient of dividing the maximum number of parallel processed threads M by the thread interval w as an expected value y of the number of times of processing time variations. The maximum number of parallel processed threads M is the maximum number of parallel processed threads M (FIG. 11) set in above step S1406 of FIG. 14. The thread interval w is the value set in above step S1703 or S1704. The expected value y of the number of times of processing time variations is an expected value of the number of times the processing time increases rapidly when the number of threads is changed up to the maximum number of parallel processed threads M, and means the number of thread intervals w of FIG. 5 or FIG. 6.

Next, in step S1706, the test apparatus 901 determines whether the number of threads x matches the maximum number of parallel processed threads M or not. When the number of threads k is smaller than the maximum number of parallel processed threads M, processing for all the number of threads x has not, finished yet, and hence the test apparatus 901 proceeds to step S1709, or when the number of threads x matches the maximum number of parallel processed threads M, this means that the processing of all the number of threads x has finished, and hence the test apparatus 901 proceeds to step S1707.

In step S1709, the test apparatus 901 calculates a value (A[x+1]−E) by subtracting the base processing time E from the calculation time A[x+1], calculates a value (A[x]−E) by subtracting the base processing time E from the calculation time A[x], and calculates a quotient (A[x+1]−E)/(A[x]−E) by dividing the value (A[x+1]−E) by the value (A[x]−E).

Here, the initial value of the base processing time E is set to 0 in above step S1701, The processing times A[x+1] and A[x] are the processing times measured in above step S1606 of FIG. 16. The processing time A[x] is the processing time of the number of threads k, and the processing time A[x+1] is the processing time of the number of threads (x+1).

Then, the test apparatus 901 determines whether or not the quotient (A[x+1]−E)/(A[x]−E) is more than or equal to the minimum calculation performance coefficient P. The test apparatus 901 proceeds to step S1713 when it is less than the minimum calculation performance coefficient P, or proceeds to step S1710 when it is more than or equal to the minimum calculation performance coefficient P.

For example, initially, the thread x is 0, and in the case of FIG. 5 and FIG. 6 for example, the processing time A[0] of one thread and the processing time A[1] of two threads are substantially the same, and thus the quotient (A[x+1]−E)/(A[x]−E) becomes approximately "1", which is less than the minimum calculation performance coefficient P. In this case, the test apparatus 901 proceeds from step S1709 to step S1713.

In step S1713, the test apparatus 901 increases the number of threads x by 1. For example, the number of threads x is increased from 0 to 1. Thereafter, the test apparatus 901 returns to the processing of step S1706, and repeats similar processing. That is, the test apparatus 901 proceeds from step S106 to step S1709. When the number of threads x is 1, for example in the case of FIG. 5 and FIG. 6, the processing time A[1] of two threads and the processing time A[2] of three threads are substantially the same. Thus, the quotient (A[x+1]−E)/(A[x]−E) becomes approximately "1", which is less than the minimum calculation performance coefficient P, and the test apparatus 901 proceeds from step S1709 to step S1713, Similarly, in the case of FIG. 5, the quotient (A[x+1]−E)/(A[x]−E) is less than the minimum calculation performance coefficient P up to the number of threads x=510, and in the case of FIG. 6, the quotient (A[x°1]−E)/(A[x]−E) becomes less than the minimum calculation performance coefficient P up to the number of threads x=126, and similar processing is repeated.

In the case of FIG. 5, when the number of threads x=511, the processing time A[512] of 513 threads is about two times the processing time A[511] of 512 threads, and thus the quotient (A[x+1]−E)/(A[x]−E) becomes approximately "2", which is more than or equal to the minimum calculation performance coefficient P. As a result, the test apparatus 901 proceeds from step S1709 to step S1710.

On the other hand, in the case of FIG. 6, when the number of threads x=127, the processing time A[128] of 129 threads is about two times the processing time A[127] of 128 threads, and thus the quotient (A[x+1]−E)/(A[x]−E) becomes approximately "2", which is more than or equal to the minimum calculation performance coefficient P. As a result, the test apparatus 901 proceeds from step S1709 to step S1710.

In step S1710, the test apparatus 901 sets the processing time A[x] as the base processing time E. For example, as described above, in the case of FIG. 5, since the number of threads x=511, the processing time A[511] of 512 threads is set as the base processing time E. On the other hand, in the case of FIG. 6, since the number of threads x=127, the processing time A[127] of 128 threads is set as the base processing time E. This set new base processing time 8 is used in the next calculation in step S1709.

Next, in step S1711, the test apparatus 901 determines whether or not the number of threads (x+1) can be divided by the thread interval w, and proceeds to step S1712 when it can be divided or proceeds to step S1714 when it cannot be divided. That is, the test apparatus 901 proceeds to step S1712 when the number of threads (x+1) is a value of integral multiple of the thread interval w, or proceeds to step S1714 when it is not a value of integral multiple.

In FIG. 5, when no defective core exists in the GPGPU 101, the number of threads x=511 as described above. Thus, the number of threads (x+1) =512, and as set in step S1703, the thread interval w=512. In this case, the number of threads (x+1)=512 can be divided by the thread interval w=512. Thus, no defective core is detected, and the test. apparatus 901 proceeds from step S1711 to step S1712.

On the other hand, when one or more defective cores exist in the GPGPU 101, the number of threads x is smaller than 511. For example, when the GPGPU 101 has one defective core, the number of threads x is 510, and when the GPGPU 101 has two defective cores, the number of threads x is 509. In this case, the number of threads (x+1) cannot be divided by the thread interval w (=512), which proves that the GPGPU 101 as the test target has defective cores, and the test apparatus 901 proceeds to step S1714.

Further, in FIG. 6, when no defective core exists in the GPGPU 101, the number of threads x=127 as described above. Thus, the number of threads (x+1) is 128, and as set in step S1704, the thread interval w=128. In this case, the number of threads (x=1)−128 can be divided by the thread interval w=128. Thus, no defective core is detected, and the test apparatus 901 proceeds from step S1711 to step S1712.

On the other hand, when one or more defective thread groups (defective cores) exist in the GPGPU 101, the number of threads x is smaller than 127. For example, when the GPGPU 101 has one defective thread group, the number of threads x is 126, and when the GPGPU 101 has two defective thread groups, the number of threads x is 125, In this case, the number of threads (x+1) cannot be divided by the thread interval w (=128), which proves that the GPGPU 101 as the test target has defective thread groups defective cores), and the test apparatus 901 proceeds to step S1714.

In step S1712, the test apparatus 901 increases the number of times z of processing time variations by 1. For example, the number of times z of processing time variations increases from 0 to 1. The number of times z of processing time variations is the number of times the processing time increases rapidly which is counted when the n umber of threads is changed up to the maximum number of parallel processed threads M, and corresponds to the number of times of the thread interval w of FIG. 5 or FIG. 6. Thereafter, the test apparatus 901 returns to the processing of step S1713, and repeats similar processing. Thereafter, in step S1709, in the case of FIG. 5, since the number of threads x is 512, the processing time A[x] is the processing time A[512] of 513 threads, the processing time A[x+] is the processing time A[513] of 514 threads, and the base processing time E is the processing time A[511] of 512 threads. Thereafter, similar processing is repeated.

In step S1706, when the number of threads x matches the maximum number of parallel processed threads M, it means that processing of all the number of threads is finished, and thus the test apparatus 901 proceeds to step S1707.

In step S1707, the test apparatus 901 determines whether the number of times z of processing time variations matches the expected value y of the number of times of processing time variations or not. The expected value y of the number of times of processing time variations is a value set in above step S1705. When the both numbers match, this proves that no defective core exists, and thus the test apparatus 901 proceeds to step S1708. When the both numbers do not match, this proves that one or more defective cores exist, and thus the test apparatus 901 proceeds to step S1714.

In step S1708, the test apparatus (output unit) 901 outputs information indicating that all the cores in the GPGPU 101 are normal to the display device 903 to have the information displayed, and outputs the information to the storage device 913 to have the information recorded. Thereafter, the test apparatus 901 ends the processing of FIG. 17 and the processing of FIG. 12.

In step S1714, the test apparatus (output unit) 901 outputs information indicating that one or more defective cores exist in the GPGPU 101 to the display device 903 to have the information displayed, and outputs the information to the storage device 913 to have the information recorded. Thereafter, the test apparatus 901 ends the processing of FIG. 17 and the processing of FIG. 12.

Thus, the result of testing the GPGPU 101 is outputted to the display device 903 and the storage device 913. In this embodiment, in step S1608 of FIG. 16, the calculation result of processing threads by the GPGPU 101 and the expected value of this calculation result are compared, and when the both do not match, information indicating that the GPGPU 101 as the test target is abnormal is outputted in step S1611 of FIG. 16. On the other hand, when the both match and then number of changes of threads matches the maximum number of processing units which can simultaneously parallel process in step S1711 of FIG. 17, information indicating that the GPGPU 101 as the test target is normal is outputted in step S1708 of FIG. 17. By performing both the test of the calculation result and the test of the processing time, it is possible to perform the test, under more strict conditions and improve the detection rate of defective cores.

A test is conceivable which increases the efficiency of floating point calculation at a maximum to derive the maximum performance of the GPGPU 101, and measures FLOPS (Floating-point number Operations Per Second) to determine whether it is in a predetermined range or not. However, this test complicates the system of the test program, and the execution time of the test program becomes as long as, for example, several minutes to several tens of minutes. Further, the test program used in the stage of product evaluation needs tuning of a floating point operation instruction sequence for measuring FLOPS due to differences in characteristics of every model of the GPGPU 101 (instruction sequence optimization specification of every processor), and hence needs a maintenance cost.

On the other hand, according to this embodiment, when the maximum number of parallel processed threads M is 100000, the GPGPU 101 can be tested appropriately in a short time as short as several seconds. Further, this embodiment does not need to consider characteristics of every model of the GPGPU 101, and hence can suppress the maintenance cost of every model of the GPGPU 101 when applied to a test program for mass-manufacturing and/or maintenance.

Note that in this embodiment, the case where the test target is the GPGPU 101 has been described as an example, but it is not limited to the GPGPU and can be applied to various types of processing devices other than the GPGPU.

The presence or absence of defect of a processing device can be detected.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

All examples and conditional language provided herein are intended for the pedagogical purposes of aiding the reader in understanding the invention and the concepts contributed by the invention to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A test method which tests a processing device using a processor executing a program stored in a memory, the test method comprising:
    obtaining a maximum number of processing units with which the processing device, as a test target, is configured to simultaneously perform parallel processing on a plurality of threads;
    specifying a number of threads, causing the processing device as the test target to parallel process the threads, and obtaining a processing time corresponding to the number of threads; and
    outputting 1) information indicating that the processing device, as the test target, is normal when the number of threads for which the processing time is more than or equal to a threshold matches the maximum number of processing units configured to simultaneously perform parallel processing, or 2) information indicating that the processing device as the test target is abnormal when the number of threads for which the processing time is more than or equal to the threshold does not match the maximum number of processing units configured to simultaneously perform parallel processing.

2. The test method according to claim 1, further comprising:
    when the processing time is more than or equal to the threshold, determining whether or not the number of threads matches the maximum number of processing units configured to simultaneously perform parallel processing; and
    outputting 1) information indicating that the processing device as the test target is normal when the number of threads matches the maximum number of processing units configured to simultaneously perform parallel processing, or 2) information indicating that the processing device as the test target is abnormal when the number of threads does not match at least one time.

3. The test method according to claim 1, wherein the maximum number of processing units configured to simultaneously perform parallel processing is the total number of cores in the processing device.

4. The test method according to claim 1, wherein:
    the maximum number of processing units configured to simultaneously perform parallel processing is the total number of thread groups in the processing device, the thread groups each have a plurality of cores; and
one thread is processed in a unit of each thread group.

5. The test method according to claim 1, further comprising:
comparing a calculation result of processing the threads by the processing device with an expected value of the calculation result; and
outputting 1) information indicating that the processing device as the test target is abnormal when the calculation result of processing the threads does not match the expected value of the calculation result, or 2) information indicating that the processing device as the test target is normal when the calculation result of processing the threads matches the expected value of the calculation result and the number of threads matches the maximum number of processing units configured to simultaneously perform parallel processing.

6. The test method according to claim 1, further comprising:
causing the processing device to parallel process the threads while changing the number of threads sequentially, and obtaining a processing time corresponding to each of the numbers of threads.

7. A test apparatus which tests a processing device, the test apparatus comprising:
a processing unit number obtaining unit which obtains a maximum number of processing units with which the processing device as a test target is configured to simultaneously perform parallel processing on a plurality of threads;
a processing time obtaining unit which specifies a number of threads, causes the processing device as the test target to parallel process the treads, and obtains a processing time corresponding to the number of threads; and
an output unit which outputs 1) information indicating that the processing device as the test target is normal when the number of threads for which the processing time is more than or equal to a threshold matches the maximum number of processing units configured to simultaneously perform parallel processing, or 2) information indicating that the processing device as the test target is abnormal when the number of threads for which the processing time is more than or equal to the threshold does not match the maximum number of processing units configured to simultaneously perform parallel processing.

8. The test apparatus according to claim 7, further comprising:
a determining unit which, when the processing time is more than or equal to the threshold, determines whether the number of threads matches the maximum number of processing units configured to simultaneously perform parallel processing,
wherein the output unit outputs 1) information indicating that the processing device as the test target is normal when the number of threads matches the maximum number of processing units configured to simultaneously perform parallel processing, or 2) information indicating that the processing device as the test target is abnormal when the number of threads does not match at least one time.

9. The test apparatus according to claim 7, wherein the maximum number of processing units configured to simultaneously perform parallel processing is the total number of cores in the processing device.

10. The test apparatus according to claim 7, wherein:
the maximum number of processing units configured to simultaneously perform parallel processing is the total number of thread groups in the processing device,
the thread groups each have a plurality of cores; and
one thread is processed in a unit of each thread group.

11. The test apparatus according to claim 7, further comprising:
a comparing unit which compares a calculation result of processing the threads by the processing device with an expected value of the calculation result,
wherein the output unit outputs 1) information indicating that the processing device as the test target is abnormal when the calculation result of processing the threads does not match the expected value of the calculation result, or 2) information indicating that the processing device as the test target is normal when the calculation result of processing the threads matches the expected value of the calculation result and the number of threads matches the maximum number of processing units configured to simultaneously perform parallel processing.

12. The test apparatus according to claim 7, wherein the processing time obtaining unit causes the processing device to parallel process the threads while changing the number of threads sequentially, and obtains a processing time corresponding to each of the numbers of threads.

13. A computer-readable recording medium having stored therein a program for causing a computer to execute a process comprising:
obtaining a maximum number of processing units with which the processing device as a test target is configured to simultaneously perform parallel processing a plurality of threads;
specifying a number of threads, causing the processing device as the test target to parallel process the threads, and obtaining a processing time corresponding to the number of threads; and
outputting 1) information indicating that the processing device as the test target is normal when the number of threads for which the processing time is more than or equal to a threshold matches the maximum number of processing units configured to simultaneously perform parallel processing, or 2) information indicating that the processing device as the test target is abnormal when the number of threads for which the processing time is more than or equal to the threshold does not match the maximum number of processing units configured to simultaneously perform parallel processing.

14. The computer-readable recording medium according to claim 13, wherein the process further comprises:
when the processing time is more than or equal to the threshold, determining whether the number of threads matches the maximum number of processing units configured to simultaneously perform parallel processing; and
outputting 1) information indicating that the processing device as the test target is normal when the number of threads matches the maximum number of processing units configured to simultaneously perform parallel processing, or 2) information indicating that the processing device as the test target is abnormal when the number of threads does not match at least one time.

15. The computer-readable recording medium according to claim 13, wherein the maximum number of processing units configured to simultaneously perform parallel processing is the total number of cores in the processing device.

16. The computer-readable recording medium according to claim 13, wherein:
- the maximum number of processing units configured to simultaneously perform parallel processing is the total number of thread groups in the processing device,
- the thread groups each have a plurality of cores; and
- one thread is processed in a unit of each thread group.

17. The computer-readable recording medium according to claim 13, wherein the process further comprises:
- comparing a calculation result of processing the threads by the processing device with an expected value of the calculation result; and
- outputting 1) information indicating that the processing device as the test target is abnormal when the calculation result of processing the threads does not match the expected value of the calculation result, or 2) information indicating that the processing device as the test target is normal when the calculation result of processing the threads matches the expected value of the calculation result and the number of threads matches the maximum number of processing units configured to simultaneously perform parallel processing.

18. The computer-readable recording medium according to claim 13, wherein the process further comprises:
- causing the processing device to parallel process the threads while changing the number of threads sequentially, and obtaining a processing time corresponding to each of the numbers of threads.

\* \* \* \* \*